United States Patent
Matsumoto et al.

(10) Patent No.: US 8,544,507 B2
(45) Date of Patent: Oct. 1, 2013

(54) METHOD FOR FILLING PARTICULATE WATER-ABSORBING AGENT HAVING AS A MAIN COMPONENT WATER-ABSORBING RESIN

(75) Inventors: Koji Matsumoto, Himeji (JP); Hitoshi Utsumi, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 510 days.

(21) Appl. No.: 12/922,274

(22) PCT Filed: Mar. 13, 2009

(86) PCT No.: PCT/JP2009/054902
§ 371 (c)(1),
(2), (4) Date: Sep. 13, 2010

(87) PCT Pub. No.: WO2009/113671
PCT Pub. Date: Sep. 17, 2009

(65) Prior Publication Data
US 2011/0011491 A1 Jan. 20, 2011

(30) Foreign Application Priority Data

Mar. 13, 2008 (JP) ............................ 2008-064408
Mar. 28, 2008 (JP) ............................ 2008-088072
Apr. 25, 2008 (JP) ............................ 2008-115446
Apr. 25, 2008 (JP) ............................ 2008-115751
Jul. 18, 2008 (JP) ............................ 2008-187904
Sep. 18, 2008 (JP) ............................ 2008-238918

(51) Int. Cl.
*B65B 1/04* (2006.01)
(52) U.S. Cl.
USPC .............. 141/12; 141/10; 141/75; 141/114; 141/314
(58) Field of Classification Search
USPC ...... 141/10–12, 71, 73–78, 80, 114, 313–314
See application file for complete search history.

(56) References Cited

U.S. PATENT DOCUMENTS 4,182,386 A * 1/1980 Alack ........................... 141/83
4,782,865 A * 11/1988 Everman ...................... 141/83
(Continued)

FOREIGN PATENT DOCUMENTS

JP 1-096807 6/1989
JP 3-97803 4/1991
(Continued)

OTHER PUBLICATIONS

Microfilm of the specification and drawings annexed to the request of Japanese Utility Model Application No. 192747/1987 (Laid-open No. 96807/1989), Kawasaki Steel Corp., Jun. 27, 1989.

*Primary Examiner* — Gregory Huson
*Assistant Examiner* — Nicolas A Arnett
(74) *Attorney, Agent, or Firm* — Cesari and McKenna, LLP; Y. Rocky Tsao

(57) ABSTRACT

There is provided a filling method which is capable of suppressing uneven distribution of particle diameter and suppressing property decrease of the particulate water-absorbing agent. The method for filling the particulate water-absorbing agent according to the present invention includes a abutting step for making a member for filling the particulate water-absorbing agent abutted on a vibrator; a supplying step for supplying the particulate water-absorbing agent to the member for filling; and a vibration step for vibrating the particulate water-absorbing agent present in the member for filling by vibrating the vibrator. Preferably, the supplying step is performed by dividing into a plurality of times. Preferably, the vibration step includes an intermediate vibration step performed at a stage where a part of a plurality of times of the supplying steps is completed, and a final vibration step performed at a stage where all of a plurality of times of the supplying steps is completed. Total filling mass W2 is set preferably at 500 kg to 1500 kg.

15 Claims, 1 Drawing Sheet

(56) References Cited

U.S. PATENT DOCUMENTS

| | | | |
|---|---|---|---|
| 4,804,550 A * | 2/1989 | Bardsley et al. | 426/397 |
| 4,854,353 A * | 8/1989 | Russell | 141/74 |
| 4,872,493 A * | 10/1989 | Everman | 141/59 |
| 5,238,032 A * | 8/1993 | McGregor | 141/80 |
| 5,348,063 A * | 9/1994 | Handleman | 141/314 |
| 5,749,401 A * | 5/1998 | Shinya et al. | 141/80 |
| 5,810,060 A * | 9/1998 | Bolz et al. | 141/97 |
| 6,065,509 A * | 5/2000 | Bonney et al. | 141/71 |
| 6,089,283 A * | 7/2000 | Sienerth et al. | 141/75 |
| 6,112,504 A * | 9/2000 | McGregor et al. | 53/417 |
| 6,374,579 B1 * | 4/2002 | Muller | 53/449 |
| 6,564,534 B2 * | 5/2003 | Poulton et al. | 53/570 |
| 6,716,894 B2 | 4/2004 | Kajikawa et al. | |
| 6,727,345 B2 | 4/2004 | Kajikawa et al. | |
| 6,817,557 B2 | 11/2004 | Kakita et al. | |
| 7,163,032 B2 * | 1/2007 | Itabashi | 141/12 |
| 7,193,006 B2 | 3/2007 | Ishizaki et al. | |
| 7,267,144 B2 * | 9/2007 | Nyhof et al. | 141/314 |
| 7,267,145 B2 * | 9/2007 | Nyhof et al. | 141/314 |
| 7,331,364 B2 * | 2/2008 | Schlacchter | 141/71 |
| 2004/0060265 A1 * | 4/2004 | Boeckle et al. | 53/476 |
| 2008/0227932 A1 | 9/2008 | Funk et al. | |

FOREIGN PATENT DOCUMENTS

| | | |
|---|---|---|
| JP | 57-8601 | 1/1992 |
| JP | 2003-82107 | 3/2003 |
| JP | 2004-155963 | 6/2004 |
| JP | 2005-113135 | 4/2005 |

* cited by examiner

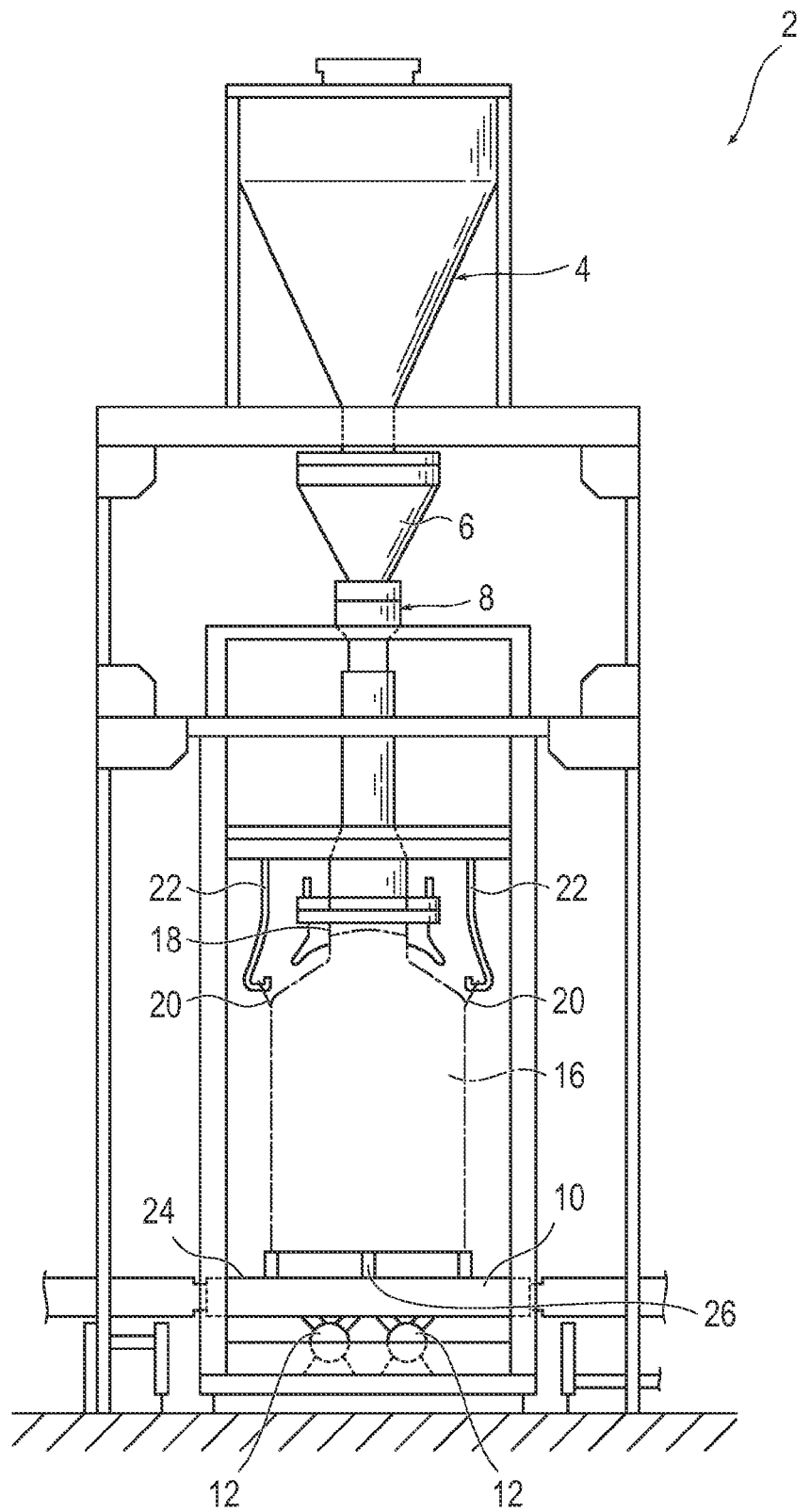

METHOD FOR FILLING PARTICULATE WATER-ABSORBING AGENT HAVING AS A MAIN COMPONENT WATER-ABSORBING RESIN

CROSS REFERENCE TO RELATED APPLICATIONS

This application is a National Stage of International Application No. PCT/JP2009/054902, filed on Mar. 13, 2009, which claims the priority of Japanese Application No. 2008-064408 filed Mar. 13, 2008, Japanese Application No. 2008-088072 filed Mar. 28, 2008, Japanese Application No. 2008-115446 filed Apr. 25, 2008, Japanese Application No. 2008-115751 filed Apr. 25, 2008, Japanese Application No. 2008-187904 filed Jul. 18, 2008, and Japanese Application No. 2008-238918 filed Sep. 18, 2008. The contents of the prior applications mentioned above are incorporated herein by reference in its entirety.

TECHNICAL FIELD

The present invention relates to a method for filling a particulate water-absorbing agent having as a main component a water-absorbing resin.

BACKGROUND ART

In recent years, in hygiene products such as disposable diapers, sanitary napkins and incontinent pads, the water-absorbing resin as a composition material thereof has been widely used, as a water-absorbent agent, in view of absorbing a body liquid. As such a water-absorbing resin, for example, there have been known a cross-linked product of partially neutralized polyacrylic acid, a hydrolysate of a starch-acrylic acid graft polymer, a saponified product of a vinyl acetate-acrylate ester copolymer, a hydrolysate of an acrylonitrile copolymer or an acrylamide copolymer and a cross-linked product thereof, and a cross-linked product of a cationic monomer and the like. This water-absorbing resin may be used after converted to also a sheet-like, fiber-like or film-like form, however, it is generally used in a water-absorbing agent after converted to a powder-like form (particulate). As such powders (particles), for example, the particulate water-absorbing agent, having a weight average particle diameter thereof of about 200 to 800 μm, is used widely.

The particulate water-absorbing agent is produced via many steps (preferably continuous steps) (for example, Patent Document 1). When the particulate water-absorbing agent is shipped, this particulate water-absorbing agent is filled in a member for filling. The particulate water-absorbing agent filled is transported by a transportation means and delivered to a shipping address (a user or the like). As this member for filling, for example, a flexible container bag is used. This flexible container bag is also referred to as "FLE-CON bag" in Japanese in abbreviation. This filling is usually performed from a hopper as described in Patent Document 2 or the like.

The particulate water-absorbing agent has been produced under control of various parameter properties (for example, absorbency, absorbency against pressure, water absorbing speed, liquid permeation, gel stability and the like), as specifications, depending on use objects (for example, disposable diapers, sanitary napkins and the like). However, in the particulate water-absorbing agent to be consumed in a large amount, property stabilization in continuous production thereof is difficult, and a small variation of property may incur property decrease of a final product (for example, disposable diapers and the like) or consumer claims, and stable property control of has been a big problem. In order to solve such a problem of property stabilization, Patent Document 3 has disclosed a method for removing the water-absorbing resin having property out of the range of the upper and lower limits, and mixing them again. Patent Document 4 has disclosed technology of using a plurality of hoppers in an intermediate step. In addition, Patent Document 5 has disclosed a method for performing polymerization in two lines, and the latter half in one line. Many proposals have been provided on technology for enhancement and stabilization of property of the particulate water-absorbing agent, by changing or furnishing a new intermediate production step, in Patent Documents 2, 3, 4, 5 and the like, however, there was sufficient room left to be improved.

PRIOR DOCUMENTS

Patent Documents

Patent Document 1: U.S. Pat. No. 6,716,894,
Patent Document 2: U.S. Pat. No. 6,817,557
Patent Document 3: U.S. Pat. No. 7,193,006
Patent Document 4: U.S. Pat. No. 6,727,345
Patent Document 5: WO2007/023097 Pamphlet

SUMMARY OF THE INVENTION

Problem to be Solved by the Invention

The present inventors have intensively studied a way to solve the problems and, as a result, have found that a filing step influences greatly on stabilization of property (in particular, AAP or SFC), and have thus completed the present invention. That is, the present inventors have been found that even when intermediate steps are controlled sufficiently precisely, variation of operation condition in the filling step, which is the final step, brings about large variation of property, resulting in generation of one factor incurring property decrease of a final product (for example, disposable diapers and the like) or consumer claims.

In addition, the present inventors have acquired novel knowledge that property of the particulate water-absorbing agent may be decreased caused by a filling method.

It is an object of the present invention to provide a filling method which is capable of suppressing property decrease of the particulate water-absorbing agent and suppressing uneven distribution of particle diameter.

Means for Solving the Problem

The method for filling the particulate water-absorbing agent according to the present invention includes a abutting step for making a member for filling the particulate water-absorbing agent abutted on a vibrator; a supplying step for supplying the particulate water-absorbing agent to the member for filling; and a vibration step for vibrating the particulate water-absorbing agent present in the member for filling by vibrating the vibrator.

Preferably, at least a part of the supplying step and at least a part of the vibration step are performed at the same time.

Preferably, in the supplying step and the vibration step, relative humidity around the member for filling is 30% to 65%.

Preferably, frequency of vibration of the vibration is 30 Hz to 120 Hz.

Preferably, the member for filling is a flexible container bag. Preferably, in the abutting step, the flexible container bag is mounted on the vibrator.

The supplying step may be performed one time, or may be performed by dividing into a plurality of times. When the supplying step is performed by dividing into a plurality of times, preferably the vibration step includes an intermediate vibration step performed at a stage where apart of a plurality of times of the supplying steps is completed, and a final vibration step performed at a stage where all of a plurality of times of the supplying steps are completed.

When the supplying step is performed by dividing into a plurality of times, and when mass of the particulate water-absorbing agent present in the member for filling in the intermediate vibration step is defined as W1 (kg), and total filling mass is defined as W2 (kg), the following range of numerical value is preferable. That is, ratio (W1/W2) is 0.3 to 0.6. In addition, mass W2 is preferably 500 kg to 1500 kg.

Preferably, AAP (4.8 kPa) of the particulate water-absorbing agent is equal to or higher than 15 g/g.

Preferably, the particulate water-absorbing agent is a polyacrylic acid or salt thereof-based water-absorbing resin containing a polyamine polymer, a polyvalent metal or salt thereof and a water-insoluble fine particle.

Preferably, temperature of the particulate water-absorbing agent in the vibration step is 30 to 70° C.

Preferably, the water-absorbing resin is an irregular shaped pulverized substance obtained by continuous kneader polymerization or continuous belt polymerization.

Advantages of the Invention

According to the present invention, amount of air present between particles of a filled substance (the particulate water-absorbing agent) can be suppressed effectively. In addition, an uneven distribution of particle diameter of the particulate water-absorbing agent in a filled state can be suppressed. Further, in continuous production of the water-absorbing agent having high absorbency against pressure (AAP) or liquid permeation (SFC), stabilization of absorption characteristics of the resultant product can be obtained.

BRIEF DESCRIPTION OF THE DRAWINGS

FIG. 1 is a schematic drawing where a filling apparatus relevant to one embodiment of the present invention is shown.

BEST MODE FOR CARRYING OUT THE INVENTION

Explanation will be given below in detail on one embodiment of the present invention, however, the scope of the present invention should not be restricted to these explanations. Embodiments other than the following exemplifications can be performed as appropriate within a range not to impair the gist of the present invention.
(1) Definition Of Terms
(a) "The Water-Absorbing Resin"

In the present description, "the water-absorbing resin" means a water swelling and water insoluble polymer gelling agent, and one having the following properties. That is, it means a polymer gelling agent having an absorbency (CRC/specified in Example) of essentially equal to or higher than 5 g/g, preferably 10 to 100 g/g, and further preferably 20 to 80 g/g, and in addition, extractable (specified in ERT450.2-02 (2002)) of essentially 0 to 50% by weight, preferably 0 to 30% by weight, further preferably 0 to 20% by weight, and particularly preferably 0 to 10% by weight. It should be noted that, said water-absorbing resin is not limited to a form where whole amount (100%) is a polymer, and may include additives and the like to be described later, in a range to maintain the performance.
(b) "Polyacrylic Acid or Salt Thereof"

In the present description, "polyacrylic acid or salt thereof" means a polymer having acrylic acid or salt thereof as a main component, as a repeating unit. Specifically, it means a polymer containing acrylic acid or salt thereof essentially in 50 to 100% by mole, preferably 70 to 100% by mole, further preferably 90 to 100% by mole, particularly preferably substantially 100% by mole, as a monomer excluding a cross-linking agent. The salt contains essentially a water-soluble salt, and is preferably a monovalent salt, and further preferably an alkali metal salt or an ammonium salt. Among them, the alkali metal salt is particularly preferable, and further a sodium salt is preferable.
(c) "The Water-absorbing Agent"

In the present description, "the water-absorbing agent" means a gelling agent of aqueous liquid, having the water-absorbing resin as a main component. It should be noted that, the aqueous liquid is not limited to water, and may be urine, blood, feces, waste liquid, moisture or steam, ice, a mixture of water and organic solvent and/or a mixture of water and inorganic solvent, rain water, underground water or the like, and not especially limited as long as it contains water. Among them, as the aqueous liquid, more preferably urine, in particular human urine is included. Content of the water-absorbing resin (polyacrylic acid or salt thereof-based water-absorbing resin) according to the present invention is preferably 70 to 99.9% by weight, more preferably 80 to 99.7% by weight, and further preferably 90 to 99.5% by weight relative to total amount. As components other than the water-absorbing resin, in view of water absorbing speed or impact resistance of powders (particles), water is preferable and the additives to be described later are contained, as needed.
(d) "EDANA" and "ERT"

"EDANA" is an abbreviation of European Disposables and Nonwovens Association, and "ERT" is an abbreviation of the measurement method (ERT/EDANA Recommended Test Methods) for the water-absorbing resin of an European standard (nearly a world standard). In the present description, unless otherwise specified, the ERT original (known document: revised in 2002) is referred to in measuring properties of the water-absorbing resin.
(e) "The Particle"

In the present description, "the particle" means a solid having a particle diameter of equal to or smaller than 5 mm specified by sieve classification and has a fluidity. Moisture content is not especially limited as long as it is a solid, however, usually it is below 30% by weight, and further preferably equal to or less than 20% by weight. In addition, the lower limit of the particle diameter is, for example, 1 nm. Further, it may be enough to have a certain fluidity as powders, for example, it means a solid whose Flow Rate (ERT450.2-02) can be measured, or a solid which can be sieve classified by (ERT420.2-02). Shape of the solid is not especially limited, and includes irregular shaped particles, spherical-shape, nearly spherical-shape, or a granulated substance (aggregated substance) thereof, however, preferably irregular shaped particles are included.

It should be noted that, "X to Y" showing a range indicates "to be equal to or higher than X and equal to or lower than X". In addition, "ton (t)" as a unit of mass means "Metric Ton". In addition, in the present description, "mass", "% by mass" and "parts by mass", are synonymous to "weight", "% by weight"

and "parts by weight", respectively, and as for measurement of property, it is measured at room temperature (20 to 25° C.)/relative humidity 40 to 50%, unless otherwise specified.

In the present invention, an object to be filled is the particulate water-absorbing agent. In the present description, "the particulate water-absorbing agent" has the water-absorbing resin as a main component. This "main component" means that content rate of the water-absorbing resin is equal to or higher than 80% by mass, relative to the particulate water-absorbing agent. That is, the particulate water-absorbing agent according to the present invention includes the water-absorbing resin in equal to or higher than 80% by mass, and preferably 90 to 99.999% by mass. In general, this particulate water-absorbing agent is produced via (1) a polymerization step for obtaining a polymer gel from a monomer, (2) a drying step for drying this polymer gel to obtain a dried substance, (3) a pulverization step for pulverizing this dried substance or this polymer gel, as needed, to obtain a pulverized substance, (4) a classification step for sieving this pulverized substance to obtain a classified substance, (5) a surface cross-linking step for heating this classified substance and cross-linking the neighborhood of the surface thereof to obtain a surface cross-linked substance, (6) a cooling step for cooling this surface cross-linked substance, as needed, and (7) a granule sizing step for granule sizing this cooled surface cross-linked substance to obtain a granule sized substance. In addition, in the method for producing the particulate water-absorbing agent, further (8) a granulation step for granulating fine powders generated in each of the steps to obtain granulated particles may be included. By granulation of this step (8), the fine powders can be reused and it is thus preferable economically, in particular, in mass production. It should be noted that, the water-absorbing resin is not especially limited, however, from a viewpoint of property, preferably a polyacrylic acid or salt thereof-based water-absorbing resin is made as a main component.

The particulate water-absorbing agent produced in this way is supplied next to the filling step. In the filling step, the particulate water-absorbing agent is filled in the member for filling.

Explanation will be given below briefly on a method for producing the particulate water-absorbing agent which can be used in the present invention.

[The Polymerization Step]

The particulate water-absorbing agent is based on the water-absorbing resin obtained by the polymerization step. In the polymerization step, a monomer, which can become the water-absorbing resin by polymerization, is polymerized to form a polymer gel. A polymerization method used in the production method according to the present invention is not especially limited, and for example, bulk polymerization, precipitation polymerization, aqueous solution polymerization, reversed phase suspension polymerization or the like is included. In view of performance and easiness of polymerization control, aqueous solution polymerization, where the monomer can be used as an aqueous solution, or reversed phase suspension polymerization is preferable. This production method exerts effect (stabilization of property) of the present invention sufficiently in the water-absorbing resin obtained in aqueous solution polymerization. From this view point, aqueous solution polymerization, in particular continuous aqueous solution polymerization is used preferably. In continuous aqueous solution polymerization, continuous kneader polymerization or continuous belt polymerization may be used suitably.

The monomer is not especially limited, however, for example, one shown below is included: for example, an anionic unsaturated monomer such as (meth)acrylic acid, (maleic anhydride) or maleic acid, itaconic acid, cynamiic acid, vinyl sulfonic acid, allyltoluene sulfonic acid, vinyltoluene sulfonic acid, styrene sulfonic acid, 2-(meth) acrylamido-2-methylpropane sulfonic acid, 2-(meth)acryloylethane sulfonic acid, 2-(meth)acryloylpropane sulfonic acid, 2-hydrokyethyl (meth)acryloyl phosphate, and a salt thereof; a mercapto group-containing unsaturated monomer; a phenolic hydroxy group-containing unsaturated monomer; an amide group-containing unsaturated monomer such as (meth) acrylamide, N-ethyl(meth)acrylamide, N,N-dimethyl (meth) acrylamide; an amino group-containing unsaturated monomer such as N,N-dimethylaminoethyl (meth)acrylate, N,N-dimethylaminopropyl (meth)acrylate, N,N-dimethylaminopropyl (meth) acrylamide. These monomers may be used alone or two or more kinds may be used in combination as appropriate. In view of performance and cost of the resultant water-absorbing resin, the water-absorbing resin is preferably a polyacrylic acid or salt thereof-based water-absorbing resin, and as a monomer therefor, it is preferable to use acrylic acid and/or a salt thereof (for example, a salt of sodium, lithium, potassium, ammonium, amines or the like, and among these the sodium salt is preferable in view of cost), as a main component. As an acrylic acid to be used, conventionally known acrylic acid is used. Specifically, acrylic acid described in US-A-2001-0016668 and U.S. Pat. No. 6,596,901 may be used. Use amount of acrylic acid and/or the salt thereof is preferably equal to or more than 70% by mole, more preferably equal to or more than 80% by mole, further preferably equal to or more than 90% by mole, and particularly preferably equal to or more than 95% by mole (the upper limit is 100% by mole), relative to total monomer components (excluding an internal cross-linking agent to be described later). It should be noted that, when the monomer is an acid group-containing monomer, neutralization rate thereof is not especially limited, and the polymer gel may be neutralized after polymerization, as needed. In applications where there may be contact to a human body, such as hygiene goods, neutralization after polymerization is not necessary. This neutralization rate is preferably from 40% by mole to 90% by mole, and more preferably from 50% by mole to 80% by mole as a polymer.

When the above-described monomer is used as an aqueous solution in the polymerization step, concentration of the monomer in the aqueous solution (hereafter may also be referred to as "a monomer solution") is not especially limited, however, within a range of 10 to 70% by weight is preferable, and within a range of 20 to 60% by weight is further preferable. In addition, when the aqueous solution polymerization or reversed phase suspension polymerization is performed, a solvent other than water may be used in combination, as needed. It should be noted that, kind of the solvent to be used in combination is not especially limited. Further, a polymerization inhibitor or an iron component may be contained in these monomers. As content of the iron component, equal to or less than 5 ppm by weight is preferable, and equal to or less than 1 ppm by weight is more preferable. In addition, the polymerization inhibitor is not especially limited, however, for example, methoxy phenols may be used preferably. In this case, use amount of the polymerization inhibitor is equal to or less than 160 ppm by weight, which has been disclosed in U.S. Pat. No. 7,049,366.

In the polymerization step, for example, a radical polymerization initiator may be used. This radical polymerization initiator is not especially limited, and one or more kinds may be selected and used from those utilized in polymerization of the usual water-absorbing resin, depending on kind of the monomer to be polymerized, polymerization conditions and the like. For example, a thermal decomposition-type initiator (for example, a persulfate such as a sodium persulfate, a potassium persulfate, an ammonium persulfate; a peroxide such as a hydrogen peroxide, a t-butylperoxide, a t-butylhydroperoxide, a methyl ethyl ketone peroxide; an azo compound such as an azonitrile compound, an azoamidine compound, a cyclic azoamidine compound, an azoamide compound, an alkylazo compound, 2,2'-azobis(2-amidinopropane) dihydrochloride, 2,2'-azobis[2-(2-imidazoline-2-yl) propane]dihydrochloride; and the like or a photodecomposition-type initiator (for example, a benzoin derivative, a benzyl derivative, an acetophenone derivative, a benzophenone derivative, an azo compound or the like); and the like may be included. Among these, in view of cost and reduction capability of a residual monomer, the thermal decomposition type initiator is preferable, and a persulfate salt is particularly preferable. In addition, because combined use of a reducing agent can promote decomposition of the radical polymerization initiator, it is possible to make a redox-type initiator by combining both. The reducing agent is not especially limited, however, for example, sulfite or salt thereof (for example, sodium sulfite, potassium sulfite, ammonium sulfite or the like), hydrogen sulfite or salt thereof (for example, sodium hydrogen sulfite, potassium hydrogen sulfite, ammonium hydrogen sulfite or the like), pyrosulfite or salt thereof, L-ascorbate or salt thereof, a reductive metal or salt thereof such as ferrous salt or the like; dithionite or salt thereof, trithionate or salt thereof, tetrathionate or salt thereof, thiosulfate or salt thereof, dimethylsulfoxide, phosphite or salt thereof, nitrite or salt thereof, thiourea dioxide, amino acid, amines (ethanolamine or the like), or the like is included. More preferable one is combined use of the photodecomposition-type initiator and the thermal decomposition-type initiator. Use amount of the radical polymerization initiator to be used in the polymerization step is not especially limited, however, usually 0.001 to 2% by weight is preferable, and 0.01 to 0.15% by weight is more preferable relative to use amount of the monomer. The use amount of the radical polymerization initiator of below 0.001% by weight relative to use amount of said monomer, increases the unreacted monomer, and increases amount of residual monomers in the resultant water-absorbing resin, and is thus not preferable. On the other hand, said use amount of over 2% by weight increases water-soluble components in the resultant water-absorbing resin, and is thus not preferable. It should be noted that, in this polymerization step, instead of the radical polymerization initiator, the monomer may be polymerized by irradiation of activated energy rays such as radiation rays, electron beams, and UV rays.

In addition, in the polymerization step, an internal cross-linking agent may be used, as needed. As the internal cross-linking agent, a conventionally known internal cross-linking agent, having two or more polymerizable unsaturated groups or two or more reactive groups, in one molecule, is included. As the internal cross-linking agent, for example, N,N'-methylenebis(meth)acrylamide, (poly)ethylene glycol di(meth)acrylate, (poly) propylene glycol di(meth)acrylate, trimethylolpropane tri(meth)acrylate, trimethylolpropane di(meth)acrylate, glycerin tri(meth)acrylate, glycerin acrylate methacrylate, ethylene oxide modified trimethylolpropane tri(meth)acrylate, pentaerythritol tetra(meth)acrylate, pentaerythritol hexa(meth)acrylate, triallyl cyanurate, triallyl isocyanurate, triallyl phosphate, triallyl amine, poly(meth) allyoxy alkane, (poly)ethylene glycol diglycidyl ether, glecerol diglycidyl ether, ethylene glycol, polyethylene glycol, propylene glycol, glycerin, 1,4-butanediol, pentaerythritol, ethylene diamine, ethylene carbonate, propylene carbonate, polyethylene imine, glycidyl (meth)acrylate or the like is included. These internal cross-linking agents may be used only one kind, or two or more kinds may be used. Among these, in consideration of water absorbing characteristics or the like of the resultant water-absorbing resin, it is preferable that a compound having two or more polymerizable unsaturated groups is used essentially as the internal cross-linking agent, and use amount of the internal cross-linking agent may be determined as appropriate by desired property of the water-absorbing resin, however, usually use amount of the internal cross-linking agent is preferably 0.001 to 5% by mole, more preferably 0.005 to 3% by mole, and still more preferably 0.01 to 1.5% by mole, relative to the monomer (the whole monomer).

In the polymerization step, further as needed, various foaming agents such as a carbonate (hydrogen) salt, carbon dioxide, an azo compound, an inert organic solvent; a hydrophilic polymer such as starch-cellulose, a derivative of starch-cellulose, polyvinyl alcohol, polyacrylic acid or salt thereof, a cross-linked substance of polyacrylic acid or salt thereof; various surfactants; a chain transfer agent such as hypophosphorous acid or salt thereof; or the like, may be added to the reaction system, as appropriate, within a range not to impair effect of the present invention (for example, the various foaming agents in equal to or lower than 30 parts by weight, the hydrophilic polymer in equal to or lower than 30 parts by weight, and the chain transfer agent in equal to or lower than 1 part by weight relative to 100 parts by weight of the monomer).

Polymerization temperature in the polymerization step is not especially limited, however, setting at usually 10 to 140° C. is preferable. The polymerization temperature below 10° C. not only lengthens polymerization time and decreases productivity but also could decrease property of the water-absorbing resin. On the other hand, the polymerization temperature over 140° C. could decrease property of the water-absorbing resin. Polymerization time is also not especially limited, and may be determined as appropriate depending on kinds of the monomers and the polymerization initiator, polymerization temperature, or the like. In addition, the polymerization is performed usually under normal pressure, in view of easiness of operation thereof, however, in order to decrease boiling point in polymerization, it is also a preferable aspect that this polymerization is performed under reduced pressure.

In this production step, in view of performance and easiness of polymerization control, for example, after mixing sodium persulfate as the thermal decomposition-type initiator and L-ascorbic acid as the reducing agent, into a monomer solution composed of an aqueous solution of a partial sodium salt of acrylic acid containing polyethylene glycol diacrylate as the internal cross-linking agent, this mixed solution may be supplied to a flat plane steel belt having a weir at the side, and aqueous solution polymerization may be performed continuously on this belt. Such a polymerization method is called belt polymerization. As a polymerization method other than this belt polymerization, continuous kneader polymerization described in Example 1 of U.S. Pat. No. 6,867,269 may be used. The water-absorbing resin having desired performance can be obtained in this case as well.

That is, in the present invention, it is preferable that in production of the water-absorbing resin, continuous kneader polymerization or continuous belt polymerization is used. In such a step, the water-absorbing resin (particles) is obtained in high productivity, as the irregular shaped crushed substance with high property, however, such irregular shaped particles are difficult to be filled, and there are problems of variation of or decrease in property in filling, and the problem of such variation or decrease is serious, in particular, in continuous production in a large scale, however, because such problems can be solved by the present invention, the present invention can be applied suitably. For such continuous kneader polymerization, for example, U.S. Pat. Nos. 6,987,151, 6,710,141 or the like is applied suitably, and for the continuous belt polymerization, for example, U.S. Pat. Nos. 4,893,999, 6,241,928, US-A-2005-215734 or the like is applied suitably.

[The Drying Step]

By the drying step, the polymer gel (another name; a water-containing gel-like polymer) obtained in the polymerization step is dried. In the drying step, although not limited to the following, the polymer gel with a moisture content of 15 to 70% by mass, obtained in the polymerization step, is dried. It is preferable that the polymer gel obtained in the polymerization step is preferably supplied to the drying step, usually in a particulate state of about 0.1 to 5 mm. Therefore, when the polymer gel is larger than above, it is preferably subjected to crushing processing in advance before the drying step. The crushing means is not especially limited, however, for example, various cutting means such as a meat chopper, a roller-type cutter, a guillotine cutter, a slicer, a roll cutter, a shredder, scissors, may be used alone or in combination as appropriate.

A drying method in said drying step is not especially limited, however, a method for using usual dryer and a heating furnace such as a hot air dryer, azeotropic dehydration may be used widely. In more specifically, as a drying apparatus, a conductive heat transfer-type dryer, a radiation heat transfer-type dryer, a hot air heat transfer-type dryer, an inductive heating dryer, or the like is exemplified. In view of speed of drying, the hot air heat transfer-type dryer (hereafter, referred to as a hot air dryer) is preferable. As this hot air dryer, a drying apparatus such as a through-flow band-type, a through-flow circuit-type, a through-flow vertical-type, a parallel flow band-type, a through-flow tunnel-type, a through-flow groove-type, a fluidized bed-type, an air flow-type, a spray-type is included. In view of easiness of property control of the particulate water-absorbing agent, the through-flow band-type is preferable. There was observed tendency of property decrease by increase in a production scale, even in such a through-flow band-type, however, because the present invention is capable of solving such a problem, the through-flow band-type dryer can be applied suitably. As drying temperature, setting at relatively high temperature is preferable, specifically 80 to 300° C. is preferable. Drying time is not especially limited, however, it may be set at the time so as to attain desirable solid content rate of the resultant dried substance. It is preferable that solid content rate of the dried substance obtained in the drying step (specified as reduced amount by drying in heating at 180° C. for 3 hours) is equal to or higher than 90% by mass, in view of easiness of pulverization. In general, in view of production efficiency, it is preferable that said drying time is usually within two hours, although it depends on particle diameter of the polymer gel, drying temperature, air volume or the like.

[The Pulverization Step]

The pulverization step is the step for pulverizing the polymer gel or a dried substance thereof. Pulverization is usually performed for a dried substance of the polymer gel obtained in the drying step, however, it may be performed for the polymer gel obtained in the polymerization step before drying. By this pulverization, the particulate water-absorbing resin as a pulverized substance can be obtained Pulverization is preferably performed so that the particulate water-absorbing resin with desired particle diameter (preferably, a weight average particle diameter of 200 to 800 µm) can be obtained as many as possible. A method for pulverization is not especially limited, and a conventionally known method can be adopted. Because of generation of the fine powders by this pulverization, the fine powders are included in the particulate water-absorbing resin obtained in the pulverization step. It should be noted that, when particle diameter of the particulate water-absorbing resin obtained in the drying step is small, it is not necessary to perform this pulverization step.

Particles of the particulate water-absorbing resin or the water-absorbing agent obtained via the pulverization step becomes irregular shaped pulverized substances (irregular shaped particles), and such a shape obtained by pulverization is preferable because it can provide a large specific surface area and make the water-absorbing agent fixed to pulp easily as well. That is, the water-absorbing resin is preferably irregular shaped pulverized substances (irregular shaped particles). In addition, in the pulverization step or the like, the fine powders or powder dust are easily generated, however, because such a problem can be solved by the present invention, the present invention can be applied preferably.

As a pulverization method, the dried substance is pulverized and classified for particle diameter control. As for these methods, for example, it has been described in US-A-2006/024755. Among these, in view of particle size control, a roll mill or a roll granulator can be used suitably, and pulverization with one-stage, or preferably multi-stage, and further 2 to 5-stage roll mill or a roll granulator can be applied. Although decrease of particle size control tended to be observed when production scale is increased even if the roll granulator is applied, the present invention can be applied suitably because such the problem also can be solved by this invention.

[The Classification Step]

The classification step is the step for classifying the pulverized substance or the dried substance obtained in the above-described pulverization step. In the classification step, the pulverized substances can be classified. In this classification step, by selecting particles having desired particle diameter (preferably, a weight average particle diameter of 200 to 800 µm), the objective particulate water-absorbing resin can be obtained. A classification method is not especially limited and a conventionally known method can be adopted. It should be noted that, in this classification step, the particulate water-absorbing resin contained as the fine powders in the pulverized substance, may be obtained as a residual substance.

The classification methods for the water-absorbing resin are not especially limited, and exemplified in U.S. Pat. No. 6,164,455 specification, WO-2006/074816, WO-2008/037672, WO-2008/037673, WO-2008/037675, WO-2008/123477 and the like. Among these, in particular, sieve classification is applied, where the number of the sieves is determined as appropriate in about 2 to 5 stages.

[The Surface Cross-linking Step]

The surface cross-linking step is the step for cross-linking the neighborhood of the surface of the particulate water-absorbing resin obtained in the above-described classification step, using a surface cross-linking agent. By this step, the particulate water-absorbing agent is obtained. The particulate water-absorbing resin is a water swelling cross-linked polymer, and has a cross-linked structure inside (of the particles), however, it is preferable that the water-absorbing resin (the particles) used in the present invention is further surface cross-linked, and cross-link density of the surface thereof or the neighborhood of the surface is increased as compared with that of the inside. By such surface cross-linking step, aggregation of the particulate water-absorbing resin can be suppressed. It should be noted that, "the neighborhood of the surface" indicates apart of the surface layer usually with a thickness of equal to or less than several tens μm, or a part of the surface layer with a thickness of equal to or less than 1/10 of total thickness, however, this thickness is determined as appropriate depending on objectives. Such surface cross-linking of the particulate water-absorbing resin may be (1) surface cross-linked with an organic surface cross-linking agent and/or a water-soluble inorganic surface cross-linking agent, exemplified as a surface cross-linking agent to be described later, (2) surface cross-linked performed by cross-linking polymerization of a cross-linkable monomer at the surface thereof (for example, as disclosed in U.S. Pat. No. 7,201,941), or (3) surface cross-linking performed by radical surface cross-linking with a persulfate salt or the like (for example, as disclosed in U.S. Pat. No. 4,783,510). In addition, it is preferable that the cross-linking reaction is promoted by heating or radiation rays (preferably UV rays as disclosed in EP No. 1824910). In this way, productivity can be enhanced. By surface cross-linking of the neighborhood of the surface of the particulate water-absorbing resin, absorbency against pressure (AAP) of the particulate water-absorbing agent, in other word, absorbing capability against pressure can be increased. In further detailed description, "surface cross-linking" in the present application means that a region of the surface or the neighborhood of the surface of the particulate water-absorbing resin has been surface cross-linked by chemical or physical modification. For example, in the case of partially neutralized cross-linked polyacrylic acid, as an example, chemical modification means a state that the surface cross-linking has been performed with the organic surface cross-linking agent, such as a polyhydric alcohol, a polyvalent glycidyl compound, a polyvalent amine or the like, having two or more functional groups being able to react with a functional group, in particular, a carboxyl group, present at the neighborhood of the surface of the particles. Other than this, it includes surface cross-linking by ionic bond of a surface carboxyl group by a polyvalent metal such as trivalent aluminum. The binding form in the surface cross-linking is not especially limited. In the present invention, the particulate water-absorbing resin cross-linked at the surface or the neighborhood of the surface is the particulate water-absorbing agent.

Explanation will be given below on a method for surface cross-linking using a surface cross-linking, as a preferable cross-linking method. As the surface cross-linking agent to be used in the surface cross-linking step, a conventionally known surface cross-linking agent is used suitably. For example, there is included a polyhydric alcohol compound such as ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerin, polyglycerin, 2-butene-1,4-diol, 1,4-butanediol, 1,5-pentanediol, 1,6-hexanediol, 1,2-cyclohexanedimethanol, 1,2-cyclohexanediol, trimethylol propane, diethanol amine, triethanol amine, polyoxypropylene, an oxyethylene-oxypropylene block copolymer, pentaerythritol, sorbitol; an epoxy compound such as ethylene glycol diglycidyl ether, polyethylene glycol diglycidyl ether, glycerol polyglycidyl ether, diglycerol polyglycidyl ether, polyglycerol polyglycidyl ether, propylene glycol diglycidyl ether, polypropylene glycol diglycidyl ether, glycidol; a polyvalent amine compound such as ethylenediamine, diethylenetriamine, triethylenetetramine, tetraethylenepentamine, pentaethylenehexamine, polyethyleneimine or an inorganic salt or an organic salt (an aziridinium salt or the like) thereof; a polyvalent isocyanate compound such as 2,4-tolylene diisocyanate, hexamethylene diisocyanate; a polyvalent oxazoline compound such as 1,2-ethylene-bis-oxazoline; an alkylene carbonate compound such as 1,3-dioxolane-2-one, 4-methyl-1,3-dioxolane-2-one, 4,5-dimethyl-1,3-dioxolane-2-one, 4,4-di-methyl-1,3-dioxolane-2-one, 4-ethyl-1,3-dioxolane-2-one, 4-hydroxymethyl-1,3-dioxolane-2-one, 1,3-dioxane-2-one, 4-methyl-1,3-dioxane-2-one, 4,6-dimethyl-1,3-dioxane-2-one, 1,3-dioxopane-2-one; a halo-epoxy compound such as epichlorohydrin, epibromohydrin, α-methylepichlorohydrin; a polyvalent metal compound such as a hydroxide or chloride of zinc, calcium, magnesium, aluminum, iron, zirconium or the like; an oxazolidinone compound such as 2-oxazolidinone (exemplified in U.S. Pat. No. 6,559,239); an oxetane compound (exemplified in US-A-2002/72471); a cyclic urea compound; or the like. Among these surface cross-linking agents, in view of property, at least one kind of compound selected from a group consisting of a polyhydric alcohol compound, an epoxy compound, a polyvalent amine compound and a salt thereof, and an alkylene carbonate compound, and an oxazolidinone compound are suitable. Further, in the surface cross-linking in the present invention, one or more kinds of a surface cross-linking agent having dehydration esterification reactivity, selected from an oxazolidinone compound, an alkylene carbonate compound, a polyhydric alcohol compound, and an oxetane compound are preferable. In such a surface cross-linking step, the water-absorbing agent with high property is obtained, but because of using a reactive cross-linking agent, variation of property may generate, however, the present invention can be applied suitably due to enabling to solve such a problem. In addition, at least one kind selected from the polyhydric alcohol having carbon atoms of 2 to 10, and the oxetane compound having carbon atoms of 2 to 10 are more preferable. The polyhydric alcohol having carbon atoms of 3 to 8 is particularly preferable. These surface cross-linking agents may be used alone or, in consideration of reactivity, two or more kinds may be used by mixing. It should be noted that, the surface cross-linking step may be performed two or more times in consideration of effect thereof, and in that case, as the surface cross-linking agent to be used in and subsequent to the second time, the same one as that used in the first time may be used, or a surface cross-linking agent different from that used in the first time may be used. In this surface cross-linking step, a method for surface cross-linking with a monomer containing a cross-linking agent (JP No. 2530668), a method for surface cross-linking with a radical initiator (JP-A-63-99211), a method for surface cross-linking with a radical initiator and a monomer (US-A-2005/0048221) or the like, may suitably be used. It should be noted that, it is preferable that use amount of the surface cross-linking agent is from 0.001 part by variation to 5 parts by variation, still more from 0.001 part by variation to 4 parts by variation, and still more from 0.05 part by variation to 3 parts by variation, relative to 100 parts by mass of the solid content of the water-absorbing resin.

In the surface cross-linking step, in addition to the surface cross-linking agent, further an organic acid (lactic acid, citric acid, p-toluenesulfonic acid) or a salt thereof, an acid substance of an inorganic acid (phosphoric acid, sulfuric acid, sulfurous acid) or a salt thereof, a basic substance such as sodium hydroxide or sodium carbonate, a polyvalent metal salt such as aluminum sulfate, may be used in combination, in 0 to 10% by weight, further preferably 0 to 5% by weight, and particularly preferably about 0 to 1% by weight, relative to the water-absorbing resin.

In the surface cross-linking step, use amount of the above-described surface cross-linking agent depends on the surface cross-linking agent selected and a combination of the surface cross-linking agents, however, use amount from 0.001 part by weight to 10 parts by weight is preferable, and from 0.01 part by weight to 5 parts by weight is more preferable, relative to 100 parts by weight of solid content of the particulate water-absorbing resin. By using the surface cross-linking agent in this range, cross-link density of the neighborhood of the surface of the particulate water-absorbing agent can be made higher than that of the inside. The case where the use amount of the surface cross-linking agent exceeds 10 parts by weight is not only uneconomical but also makes excessive supply of the cross-linking agent for forming an optimal cross-link structure to the particulate water-absorbing resin, and is thus not preferable. The case where the use amount of the surface cross-linking agent is below 0.001 part by weight does not provide sufficient improvement effect in enhancing performance of absorbency against pressure or the like of the particulate water-absorbing agent, and is thus not preferable.

In the surface cross-linking step, it is preferable to use water as a solvent in mixing the particulate water-absorbing resin and the surface cross-linking agent. Use amount of water depends on kind of the water-absorbing resin, particle diameter, and moisture content of the particulate water-absorbing resin or the like, however, use amount over 0 part by weight and equal to or lower than 20 parts by weight is preferable, and use amount within a range of 0.5 to 10 parts by weight is more preferable, relative to 100 parts by weight of solid content of the particulate water-absorbing resin. In mixing the particulate water-absorbing resin and the surface cross-linking agent, a hydrophilic organic solvent may be used in combination, as needed. In this case, as the hydrophilic organic solvent to be used in combination, for example, lower alcohols such as methyl alcohol, ethyl alcohol, n-propyl alcohol, isopropyl alcohol, n-butyl alcohol, isobutyl alcohol, t-butyl alcohol; ketones such as acetone; ethers such as dioxane, tetrahydrofuran; amides such as N,N-dimethylformamide; sulfoxides such as dimethylsulfoxide; or the like is included. Use amount of the hydrophilic organic solvent depends on kind of the water-absorbing resin, particle diameter and moisture content of the particulate water-absorbing resin or the like, however, use amount from 0 to equal to or lower than 20 parts by weight is preferable, and use amount within a range of 0 to 10 parts by weight is more preferable, relative to 100 parts by weight of solid content of the particulate water-absorbing resin.

In performing surface cross-linking, a method for mixing a surface cross-linking agent solution containing the surface cross-linking agent and the solvent, by spraying with a sprayer or the like or dropping to the particulate water-absorbing resin is preferable, and a method for mixing by spraying is more preferable. Size of a droplet sprayed is preferably within a range of 0.1 to 300 µm, and more preferably within a range of 0.1 to 200 µm, as an average particle diameter.

The particulate water-absorbing resin and the surface cross-linking agent solution are mixed using the mixing apparatus. In this case, the mixing apparatus preferably has large mixing force to uniformly and surely mix both. As such a mixing apparatus, for example, a cylinder-type mixing machine, a double wall cone-type mixing machine, a high speed stirring-type mixing machine, a V-character-type mixing machine, a ribbon-type mixing machine, a screw-type mixing machine, a twin arm-type kneader, a pulverizing-type kneader, a rotation-type mixing machine, an air flow-type mixing machine, Turbulizer, a batch-type Rhedige mixer, a continuous Rhedige mixer or the like is suitable.

In the surface cross-linking step, a mixture of the particulate water-absorbing resin and the surface cross-linking agent solution enables to perform surface cross-linking even at room temperature. However, in view of promotion of the reaction along with removal of water and a solvent added, it is preferable that, after mixing the particulate water-absorbing resin and the surface cross-linking agent, further heating treatment is performed to cross-link the neighborhood of the surface of the particulate water-absorbing resin. In said heating treatment, treatment temperature is preferably equal to or higher than 80° C., although it depends on the surface cross-linking agent selected. The treatment temperature of below 80° C. takes longer time in the heating treatment, and thus not only incurs decrease in productivity but also cannot attain uniform surface cross-linking. In this case, it is worried to decrease absorption characteristics under pressurization of the particulate water-absorbing agent, as well as remain the unreacted surface cross-linking agent. The treatment temperature over 250° C. incurs deterioration of the particulate water-absorbing resin, and decreases performance of the particulate water-absorbing agent obtained by surface cross-linking, and is thus not preferable. From this view point, the treatment temperature (temperature of a heating medium or temperature of a material/in particular, temperature of the heating medium) is preferably in a range of 100 to 250° C., more preferably in a range of 150 to 250° C. (in particular, it is suitable for the surface cross-linking agent having dehydration esterification reactivity). Heating time is preferably in a range of 1 minute to 2 hours. Suitable examples of a combination of heating temperature and heating time are at 180° C. for 0.1 to 1.5 hour and at 200° C. for 0.1 to 1 hour.

As the heating apparatus for performing the heating treatment, a conventional dryer or a heating furnace is used. For example, a dryer or a heating furnace of a conductive heat transfer-type dryer, a radiation heat transfer-type dryer, a hot air heat transfer-type dryer, an inductive heating-type dryer is suitable. Specifically, a dryer or a heating furnace of a belt-type, a groove stirring-type (for example, a paddle dryer), a screw-type, a rotation-type, a disk-type, a kneading-type, a fluid bed-type, an air flow-type, an infrared ray-type, an electron beam-type is included.

In the surface cross-linking step, the heating treatment may be performed in a static state or under stirring. When the heating treatment is performed under stirring, the surface cross-linking may be completed by heating the mixture in the mixing apparatus, where the particulate water-absorbing resin and the surface cross-linking agent were mixed, and the surface cross-linking may be completed by heating said mixture, by charging the mixture, for example, into a twin-screw groove-type stirring drying apparatus.

[The Cooling Step]

The cooling step is the step performed arbitrary after the surface cross-linking step, for example, the step wherein the particulate water-absorbing agent obtained by heating in the above-described surface cross-linking step and by cross-linking the neighborhood of the surface is cooled before charging to the granule sizing step to be described later. A cooling apparatus to be used in this cooling step is not especially limited, and a cooling machine is not especially limited, however, it is exemplified in U.S. Pat. No. 6,378,453 or the like, and for example, a twin-screw stirring dryer or the like may be used, where cooling water of equal to or lower than 50° C., preferably 20 to 35° C. is passed through inside of the inner wall or other heat transfer surfaces. In addition, it is preferable that the particulate water-absorbing agent is cooled to 50 to 70° C. in the cooling step. As described above, in the surface cross-linking step, there may be the case where surface cross-linking of the particulate water-absorbing resin is performed at room temperature. In this case, because the particulate water-absorbing agent obtained by the surface cross-linking is not heated, this cooling step may not be performed.

[The Addition Step of Additives]

In the present invention, the addition step for adding additives other than the surface cross-linking agent may be installed further. For example, the addition step may be an independent step separately from other steps, or the addition step may be performed in the step other than the addition step, at the same time as the relevant other step. In this case, in the addition step, the additives are added after the polymerization step, and more preferably after the drying step, for example, during the cooling step or other steps. As the additives to be added in the addition step, for example, the following (A) a deodorant component (preferably, a plant component), (B) a polyvalent metal salt, (C) an inorganic particle (including (D) a composite water-containing oxide), (E) other additives and the like may be added. By addition of the additives, various functions can be furnished to the particulate water-absorbing agent. It should be noted that, the addition of the additives to the particulate water-absorbing agent may be performed at the same time as cooling of the particulate water-absorbing agent. Further, the following (F) chelating agent or (G) surfactant may be added in the addition step.

Use amount of the (A) to (D) and (E) differs depending on objectives and functions to be furnished, however, it is usually, as addition amount of one kind thereof, in a range of 0.001 to 10 parts by mass, preferably 0.001 to 5 parts by mass, and further preferably 0.002 to 3 parts by mass, relative to 100 parts by mass of the water-absorbing resin. Usually, when this addition amount is lower than 0.001 part by mass, sufficient effect and functions to be furnished by the additives cannot be obtained, and when this addition amount is over 10 parts by mass, effect comparable to the addition amount cannot be obtained or water absorbing performance results in to be decreased.

(A) The Deodorant Component

The particulate water-absorbing agent obtained by the production method of the present invention can be formulated with the deodorant component, preferably the plant component, to exert deodorant property. As the plant component, at least one kind of a compound selected from polyphenol, flavones(s), and caffeine is preferable, and at least one kind of a compound selected from tannin, tannic acid, gall, gallnut and gallic acid is further preferable. As a plant containing the plant component which can be added to the particulate water-absorbing agent, other than these plant components, for example, *camellia, Eurya japonica, Ternstroemia gymnathera* or the like is included as the theaceous plant; rice, bamboo grass, bamboo, corn, wheat or the like is included as the Poaceae plant, and coffee is included as the Rubiaceae plant. As a form of the plant component, which can be used in the present invention, essence (essential oil) extracted from a plant, a plant itself, a plant residue or an extract residue by-produced in the production process in plant processing industry or food processing industry, or the like is included, however it is not especially limited.

(B) The Polyvalent Metal Salt

The polyvalent metal salt may be formulated into the particulate water-absorbing agent obtained by the production method of the present invention in order to enhance liquid permeation and powder hygroscopic fluidity. Preferable amount of this polyvalent metal salt is as described above. As this polyvalent metal salt, a polyvalent metal salt of an organic acid and a polyvalent metal salt of an inorganic acid are exemplified. As the preferable inorganic polyvalent metal salt, for example, aluminum chloride, aluminum polychloride, aluminum sulfate, aluminum nitrate, potassium aluminum bissulfate, sodium aluminum bissulfate, potassium alum, ammonium alum, sodium alum, sodium aluminate, calcium chloride, calcium nitrate, magnesium chloride, magnesium sulfate, magnesium nitrate, zinc chloride, zinc sulfate, zinc nitrate, zirconium chloride, zirconium sulfate, zirconium nitrate or the like is included. In addition, in view of solubility with an absorbing liquid such as urine, use of a salt thereof having crystal water is preferable. A particularly preferable one is an aluminum compound, and among these, aluminum chloride, aluminum polychloride, aluminum sulfate, aluminum nitrate, potassium aluminum bissulfate, sodium aluminum bisulfate, potassium alum, ammonium alum, sodium alum, sodium aluminate are preferable, and aluminum sulfate is particularly preferable: powders of water-containing crystal such as aluminum sulfate-octadeca hydrate salt, aluminum sulfate-tetradeca to octadeca hydrate salt may be used most suitably. They may be used as only one kind, or two more kinds may be used in combination. In view of handling property and mixing property with the particulate water-absorbing agent, the polyvalent metal salt is used preferably in a solution state, and is used particularly preferably in an aqueous solution state.

In addition, other polyvalent metal salts of organic acids to be used, and mixing methods thereof are exemplified, for example, in U.S. Pat. No. 7,282,262. As the polyvalent metal salt of the organic acid, having carbon atoms of equal to or more than 7 in the molecule, to be used in the present invention, a metal salt other than an alkaline salt of an aliphatic acid, a petroleum acid, a polymer acid or the like is included. As an organic acid composing a polyvalent metal salt of said organic acid, an aliphatic acid having a long chain or a branched chain, such as capronic acid, octyl acid, octynoic acid, decanoic acid, lauric acid, myristic acid, palmitic acid, oleic acid, stearic acid; a petroleum acid such as benzoic acid, myristicinic acid, naphthenic acid, naphthoic acid, naphthoxyacetic acid; a polymer acid such as poly(meth) acrylic acid, polysulfonic acid can be exemplified, however, an organic acid having a carboxyl group in the molecule is preferable, and an aliphatic acid such as capronic acid, octyl acid, octynoic acid, decanoic acid, lauric acid, myristic acid, palmitic acid, oleic acid, stearic acid, a cow aliphatic acid, a castor oil hardened aliphatic acid is more preferable. An aliphatic acid not having an unsaturated bond in the molecule, such as capronic acid, octanoic acid, decanoic acid, lauric acid, myristic acid, palmitic acid, stearic acid is further preferable. A long chain aliphatic acid with carbon atoms of equal to or more than 12, not having an unsaturated bond in the molecule, such as lauric acid, myristic acid, palmitic acid, and stearic acid is most preferable. As the inorganic polyvalent metal salt, for example, aluminum sulfate, calcium chloride, calcium sulfate, magnesium chloride, zinc chloride, aluminum chloride, or the like is included.

(C) The Inorganic Particle

The inorganic particle, in particular, a water-insoluble inorganic particle may be formulated into the particulate water-absorbing agent obtained by the production method of the present invention in order to prevent blocking in moisture absorption. As the inorganic powder to be used in the present invention, specifically, for example, a metal oxide such as silicon dioxide or titanium oxide; silicic acid or salt thereof such as natural zeolite or synthetic zeolite; kaolin, talc, clay, bentonite, or the like is included. Among these, silicon dioxide and silicic acid or salt thereof are more preferable, and silicon dioxide silicic acid or salt thereof, having an average particle diameter of 0.001 to 200 μm, measured by the Coulter counter method, is further preferable.

(D) The Composite Water-containing Oxide

The particulate water-absorbing agent obtained by the production method of the present invention shows superior hygroscopic fluidity (fluidity of powders after the water-absorbing resin or the water-absorbing agent absorbed moisture), and further, in order to make exert superior deodorant function, a composite water-containing oxide containing zinc and silicon, or a composite water-containing oxide containing zinc and aluminum may be formulated.

(E) Other Additives

To the particulate water-absorbing agent obtained by the production method of the present invention, as needed, for example, a disinfectant, an antimicrobial agent, perfume, various inorganic powders, a foaming agent, a pigment, a dye, a hydrophilic staple fiber, a fertilizer, an oxidizing agent, a reducing agent, water-soluble salts, or the like may be added, as appropriate, in a range not to impair effect of the present invention. The addition amount of these other additives may be set, for example, at equal to or less than 30 parts by mass, and further equal to or less than 10 parts by mass, relative to 100 parts by mass of the particulate water-absorbing agent. By this addition, various functions can be furnished.

(F) The Chelating Agent

The particulate water-absorbing agent to be used in the present invention may contain the chelating agent. The mixing step of the chelating agent is not especially limited, however, it is preferable that the chelating agent is mixed to the monomer or monomer solution. As the chelating agent, a polymer chelating agent or a non-polymer chelating agent is exemplified variously. Preferably the non-polymer chelating agent containing an acid group, and further preferably, the non-polymer chelating agent containing a phosphoric acid group or a carboxylic acid group is used. The non-polymer chelating agent having such an acid group in 2 to 100, further 2 to 50, and in particular, 2 to 10 is used preferably. In addition, a chelating agent containing nitrogen therein, such as an amino carboxylic acid or amino phosphoric acid is preferable. Specifically, for example, an amino carboxylic acid-based metal chelating agent such as iminodiacetic acid, hydroxyethyliminodiacetic acid, nitrilotriacetic acid, nitrilotripropionic acid, ethylenediamine tetraacetic acid, hydroxyethylenediamine triacetic acid, hexamethylenediamine tetraacetic acid, diethylenetriamine pentaacetic acid, triethylenetetramine hexacetic acid, trans-1,2-diaminocyclohexane tetraacetic acid, bis(2-hydroxyethyl)glycin, diaminopropanol tetraacetic acid, ethylenediamine-2-propionic acid, glycoletherdiamine tetraacetic acid, bis(2-hydroxybenzyl) ethylenediamine diacetic acid, and a salt thereof; and a phosphorous compound such as ethylenediamine-N,N'-di(methylenephosphinic acid), ethylenediamine tetra (methylenephosphinic acid), nitriloacetic acid-di (methylenephosphinic acid), nitrilodiacetic acid-(methylenephosphinic acid), nitriloacetic acid-β-propionic acid-methylenephosphonic acid, nitrilo tris(methylenephosphonic acid), cyclohexanediamine tetra(methylenephosphonic acid), ethylenediamine-N—N'-diacetic acid-N,N'-di(methylenephosphonic acid), ethylenediamine-N—N'-di (methylenephosphonic acid), ethylenediamine tetra (methylenephosphonic acid), polymethylenediamine tetra (methylenephosphonic acid), diethylenetriamine penta (methylenephosphonic acid), and 1-hydroxyethylidene diphosphonic acid, and a salt thereof; is included. Use amount of the chelating agent in the particulate water-absorbing agent is preferably 5 to 10000 ppm by mass, and more preferably 10 to 1000 ppm by mass.

(G) A Surfactant

As the surfactant, an anionic surfactant such as a fatty acid salt or a higher alcohol sulfate; a cationic surfactant or an ampholytic surfactant such as a sorbitan fatty acid ester such as sorbitan monolaurate, sorbitan monopalmitate, sorbitan monostearate, sorbitan tristearate; an alkyl amine salt such as coconut amine acetate, stearyl amine acetate is exemplified. Other than these, a surfactant described in U.S. Pat. No. 6,107,358 is applicable to the present invention. Use amount of the surfactant in the particulate water-absorbing agent is preferably 10 to 1000 ppm by mass.

The (B), (C) and (G) can be used suitably as a surface treating agent. In addition, the additives (A) to (G) may be added as an aqueous solution or an aqueous dispersion solution, and in the case of a solid, they may be dry-type mixed to the particulate water-absorbing agent, as powders (powders of preferably equal to or smaller than 300 μm) of the additives. Surface treatment in the present application means that a region of the surface or the neighborhood of the surface of the water-absorbing resin has been modified chemically or physically. The surface treatment is a concept including the surface cross-linking. For example, in the case of partially neutralized cross-linked polyacrylic acid, as an example, chemical modification means a state that the surface cross-linking has been performed with the organic surface cross-linking agent, such as a polyhydric alcohol, a polyvalent glycidyl compound, a polyvalent amine or the like, having two or more functional groups being able to react with a functional group particularly such as, a carboxyl group, which is present at the neighborhood of the surface of the particles. Other than this, for example, the surface treatment includes surface cross-linking by ionic bond of a surface carboxyl group by a polyvalent metal such as trivalent aluminum is also included to the surface treatment. Binding form in the surface treatment is not especially limited. In addition, physical modification indicates a modified state of the same surface or the neighborhood of the surface of the water-absorbing resin only by physical adhesion, without taking a form of covalent bonding or chemical bonding such as ionic bond with the water-absorbing resin. Such a state is also included in the surface treatment in the present application. For example, the above-described covered state with the polyvalent alcohol, or a covered state with the water-soluble polyvalent metal salt without accompanying with chemical bonding is a surface treated state. Simply, chemical modification indicates a state accompanying certain kind of chemical bonding, while physical modification indicates physical covering or adhesion without accompanying chemical bonding.

In particular, in the present invention, the polyvalent metal salt is preferable as the additives for enhancing liquid permeation. It is preferable that the polyvalent metal salt is mixed after the addition. As an apparatus for mixing, for example, cylinder-type mixing machine, a screw-type mixing machine, a screw-type extruder, Turbulizer, Nauta-type mixing machine, a V-character-type mixing machine, a ribbon-type mixing machine, a twin arm-type kneader, a fluidized-type mixing machine, an air flow-type mixing machine, rotation disk-type mixing machine, a roll mixer, a rolling-type mixing machine, Rhedige mixer, or the like may be included.

It should be noted that, the polyvalent metal salt is preferably mixed with the water-absorbing resin in the form of an aqueous solution. Size of a droplet of the aqueous solution can be adjusted as appropriate. In view of preventing permeation and diffusion of a polyvalent metal ion (for example, an aluminum ion) into the inside of the water-absorbing resin particles, the aqueous solution preferably has a concentration of equal to or higher than 50%, more preferably equal to or higher than 60%, further preferably equal to or higher than 70%, further preferably equal to or higher than 80%, and particularly preferably equal to or higher than 90%, relative to saturated concentration. In this case, the upper limit of the concentration of polyvalent metal salt in the aqueous solution is saturated concentration, however, a dispersion solution having over the saturated concentration is also allowed. Temperature of the aqueous solution is adjusted as appropriate in a range of equal to or lower than boiling point to adjust solubility or viscosity, however, mixing is usually performed at about room temperature (20 to 30° C.)

[The Granule Sizing Step]

In spite of adjustment of the particle diameter in the pulverization step and classification step, there may be the case where an aggregated substance having large particle diameter is included in the particulate water-absorbing agent after the cooling step. This aggregated substance may be generated mainly in mixing the surface cross-linking agent, or in a surface cross-linking reaction. In this granule sizing step, in order to re-adjust the particle size, the crushing treatment and classification treatment of this aggregated substance is performed. The method for granule sizing is not especially limited, however, it has been exemplified in U.S. Pat. No. 7,347,330, US-A-2005-011325 or the like. The order and number of this crushing treatment and classification treatment are not especially limited. In this granule sizing step, for example, firstly the classification treatment is performed for the particulate water-absorbing agent. In this classification treatment, a classification apparatus such as a sieve or an air flow classification machine is used. In this classification treatment, for example, by using a sieve having large sieve mesh size, the aggregated substance having large particle diameter can be obtained. In this way, after the aggregated substance having large particle diameter is removed, by using a sieve having small sieve mesh size, the fine powders having small particle diameter are removed. For the aggregated substance obtained by this classification treatment, the crushing treatment is performed. By this crushing treatment, particles composing the aggregated substance can be crushed and separated to an individual particle, and the particulate water-absorbing agent as a single particle can be obtained. In this crushing treatment, for example, a knife cutter-type crushing machine is used. For the crushed substance obtained by this crushing treatment, the classification treatment is performed again. In this granule sizing step, while the fine powders having small particle diameter are removed, the particulate water-absorbing agent having desired particle diameter (preferably, a weight average particle diameter of 200 to 800 μm) can be obtained. It should be noted that, in this granule sizing step, the particulate water-absorbing agent contained as the fine powders may be obtained as a residual substance.

[The Granulation Step]

The granulation step is the step for obtaining the granulated particle by adding an aqueous liquid to the fine powders generated in each of the steps, or the water-absorbing agent containing fine powders. The whole fine powders obtained in the production of the particulate water-absorbing agent may be supplied to this granulation step. The granulated particle is composed of the fine powders. Average particle diameter of the granulated particle is equal to or smaller than 20 mm, preferably 0.3 to 10 mm, and more preferably 0.35 to 5 mm. This granulated particle is charged, for example, to the drying step for drying in the co-presence of the polymer gel. When a unified giant gel-like substance is obtained by mixing the fine powders and the aqueous liquid, it must be supplied further to the drying step and the pulverization step.

In this granulating step, it can be confirmed for a granulated substance generated to be the granulated particle from the fact that an individual particle is aggregated by gathering together in multiple while maintaining shape thereof, or from the fact that it swells as a plurality of discontinuous particles in absorbing a solution, with an optical microscope.

In this granulating step, in view of drying load, the granulated particle has a moisture content of preferably equal to or lower than 75% by weight, more preferably equal to or lower than 70% by weight, and further preferably equal to or lower than 65% by weight (the lower limit is over 0% by weight, and preferably equal to or higher than 5% by weight). When the moisture content of the granulated particle is extremely higher than that of the polymer gel, partially incomplete drying could be generated in drying this granulated particle and the polymer gel in a co-present state.

In this granulation step, in view of mixing property with the aqueous liquid or drying efficiency, temperature of the fine powders is preferably equal to or higher than 35° C., more preferably 40 to 100° C., and further preferably 45 to 80° C. Temperature of the fine powders may be adjusted as appropriate by warming, heating, cooling or the like at each process of production of the particulate water-absorbing agent.

In this granulating step, the aqueous liquid may be one where the additive is dissolved in a solvent. This additive is at least one kind of additive selected from a group consisting of a thermal decomposition-type radical polymerization initiator, an oxidizing agent and a reducing agent to decrease amount of a residual monomer. A solvent of the aqueous liquid is not especially limited and, for example, water, an aqueous solution containing a hydrophilic organic solvent (for example, lower alcohols such as methyl alcohol, ethyl alcohol, n-propyl alcohol, isopropyl alcohol, n-butyl alcohol, isobutyl alcohol, t-butyl alcohol; ketones such as acetone; ethers such as dioxane, tetrahydrofuran; amides such as N,N-dimethylformamide; sulfoxides such as dimethylsulfoxide) is included. From a view of property or granulation strength, it is desirable that the aqueous liquid contains water preferably in 90 to 100% by weight, and more preferably in 99 to 100% by weight, and is particularly preferably composed of only water. In addition, other additives such as a cross-linking agent, a chelating agent, a surfactant may be contained to the aqueous liquid in small amount in a range not to impair effect of the present invention. For example, as the cross-linking agent, the cross-linking agent as described above may be used. By containing the cross-linking agent in the aqueous liquid, reduction of water-soluble components, or enhancement of granulation strength can be expected.

In this granulating step, as the thermal decomposition-type radical polymerization initiator which can be used as the additive, the thermal decomposition-type initiator exemplified in the polymerization step may be used preferably in a similar way. Among these, a peroxide is preferable, and a persulfate salt such as sodium persulfate is particularly preferable. These thermal decomposition-type radical polymerization initiators may be only one kind, or may be two or more kinds. The oxidizing agent is not especially limited as long as it can react with the monomer, in drying the granulated particle and the polymer gel in a co-present state. As this oxidizing agent, for example, an inorganic oxidizing agent such as a chlorate salt, a bromate salt, a chlorite salt, a hypochlorite salt; the persulfate salt or hydrogen peroxide exemplified also as the thermal decomposition-type radical polymerization initiator or the like; an inorganic peroxide or an organic peroxide such as t-butyl peroxide, benzoyl peroxide; or the like is included. Among these, the persulfate salt or hydrogen peroxide is preferable, and the persulfate salt is particularly preferable. These oxidizing agents may be only one kind, or may be two or more kinds. The reducing agent is not especially limited, and may be an organic reducing agent or an inorganic reducing agent. As this reducing agent, the inorganic reducing agent is preferable, and a sulfur-based, a phosphorous-based, or a nitrogen-based reducing agent is particularly preferable. Specifically, the reducing agent exemplified in the polymerization step may be used preferably in a similar way. Among these, the sulfur-based reducing agent, in particular, a sulfite salt, a hydrogen sulfite salt, a pyrosulfite salt, or a dithionite salt is preferable, and as a salt thereof, a sodium salt, a potassium salt, or an ammonium salt is preferable. Among these, sodium sulfite, or sodium hydrogen sulfite is particularly preferable. These reducing agents may be only one kind, or may be two or more kinds. As this additive, among those described above, the thermal decomposition-type radical polymerization initiator is preferable, and in particular, use of the persulfate salt as the additive is preferable in view of exerting superior reducing effect of the residual monomer.

In this granulating step, content of the additive in the aqueous liquid is not especially limited, however, it is preferably 0.0001 to 1% by weight, relative to the fine powders. The content below 0.0001% by weight could not decrease the residual monomer sufficiently, on the other hand, the content over 1% by weight could generate coloring to the final particulate water-absorbing agent obtained after drying.

In the granulating step, use amount of the aqueous liquid is not especially limited, however, from 25 parts by weight to 280 parts by weight, relative to 100 parts by weight of the fine powders is preferable. More preferably, it is equal to or lower than 200 parts by weight, and further preferably, it is equal to or lower than 150 parts by weight. The use amount of the aqueous liquid of over 280 parts by weight results in providing a unified giant gel-like substance with high moisture content, and thus makes difficult to dry and pulverize said gel-like substance. In particular, it requires tremendous load in drying. On the other hand, when the use amount of the aqueous liquid is less than 25 parts by weight, granulation strength becomes insufficient, and it could not exert superior characteristics in a final product, as well as makes mixing inhomogeneous and could make granulation difficult.

In this granulating step, when the fine powders are granulated, it is enough to mix the fine powders and the aqueous liquid, however, in particular, in the granulation, it is preferable that the aqueous liquid is heated in advance, and further it is a preferable aspect that granulation is performed by high speed mixing of said aqueous liquid heated and the fine powders. In this way, the granulated particle with directly controlled particle diameter can be obtained without making the unified giant gel-like substance. As a result, it becomes easy to obtain the granulated particle by further drying and pulverizing the gel-like substance, and thus there can be avoided a problem generating when the unified giant gel-like substance is obtained, that is, a problem of deterioration of the particulate water-absorbing agent itself caused by generation of scission or entanglement of a main chain, since force required for mixing becomes enormous or the gel-like substance is kneaded in a bulk state.

In this granulating step, in a preferable aspect of the granulation, temperature in heating the aqueous liquid is usually equal to or higher than 40° C., preferably equal to or higher than 50° C., more preferably equal to or higher than 60° C., and further preferably equal to or higher than 70° C. In addition, the upper limit of said temperature is equal to or lower than boiling point of the aqueous liquid, and the boiling point may be adjusted variously by changing the addition of salts or other solvents, pressure (reduced pressure, pressurization), or the like. Because there is no big change even when the temperature is over 100° C., heating of the aqueous liquid is performed usually at equal to or lower than 100° C. It should be noted that, when the aqueous liquid is heated in advance, it is preferable that the additive is made in the form of an aqueous liquid with relatively high concentration separately at room temperature or under cooling, and then this aqueous liquid is mixed with a relatively large quantity of the residual part of the aqueous liquid, which has been heated in advance, just before mixing with the fine powders.

In this granulating step, in a preferable aspect of the granulation, it is preferable that the aqueous liquid is heated in advance, and further the fine powders themselves are heated in advance. Temperature in heating this fine powders is also usually equal to or higher than 40° C., and preferably equal to or higher than 50° C. Because there is no big change even when the temperature is over 100° C., heating of the fine powders is performed usually at equal to or lower than 100° C. It should be noted that, when the fine powders themselves are heated in advance, means thereof is not especially limited, and for example, they may be heated by drying and then retaining heat, or they may be heated separately from outside.

In this granulating step, in a preferable aspect of the granulation, the heated aqueous liquid and the fine powders are subjected to high speed mixing. High speed mixing means that time for completing mixing of the aqueous liquid and the fine powders, and time till generation of the granulated particle is short time. That is, it means that time from contacting of the aqueous liquid and the fine powders to generation of the granulated particle, in other word, mixing time is short time. Said mixing time is preferably equal to or shorter than 3 minutes, more preferably equal to or shorter than 1 minute, and 1 second to 60 seconds is the most preferable. When mixing time is long, uniform mixing of the aqueous liquid and the fine powders becomes difficult, and it tends to provide the unified giant gel-like substance. In addition, when mixing time is long, the additives contained in the aqueous liquid may decompose until supply of the granulated particle generated and the polymer gel together to the drying step, and could provide the case where sufficient amount of the additive cannot be present in the drying step. Further, continued mixing for a long time could incur performance decrease of the particulate water-absorbing agent, such as increase in water-soluble components or decrease in absorbency against pressure of the particulate water-absorbing agent obtained after completion of mixing.

It should be noted that, amount of the granulated particle to be used in recycling the granulated particle is preferably 5 to 40% by mass and more preferably 10 to 30% by mass, relative to the polymer gel (100% by mass) obtained by the polymerization step.

[The Filling Step]

The filling step is a step where the particulate water-absorbing agent produced via at least a part of the steps is filled in a member for filling. In the present description, "the member for filling" means a member to be filled for filling the particulate water-absorbing agent produced as above. Explanation will be given later on detail of this filling step. The particulate water-absorbing agent filled in the member for filling is shipped, for example, after the predetermined inspection is performed. It should be noted that, the filling method of the present invention is suitably used in performing continuous production. The present invention brings about stabilization of absorption characteristics of a product obtained continuously, in a production scale of preferably equal to or more than 500 kg/h, further preferably equal to or more than 1 ton/h, and particularly preferably equal to or more than 1.5 ton/h (the upper limit is about 15 ton/h). And, as for those containing various additives to furnish function to the water-absorbing agent, there may be the case where amount of the additives is necessary to be managed strictly. Even in such a case, according to the method of the present invention, various characteristics of the particulate water-absorbing agent can be maintained stably. Therefore, the present invention is used suitably as the filling method for the water-absorbing agent including the polyvalent metal salt, the inorganic particle or the like.

It should be noted that, particle shape of the particulate water-absorbing agent or the particulate water-absorbing resin according to the present invention is not especially limited. As this particle shape, spherical-shape, nearly spherical-shape, irregular shaped pulverized substance (which is a pulverized substance), bar shape, polygonal shape, sausage shape (for example; refer to U.S. Pat. No. 4,973,632), a particle with wrinkles (for example; refer to U.S. Pat. No. 5,744, 564) or the like is included. They may be a single particle, or granulated particle, or a mixture of the single particle and the granulated particle. In addition, the particle may be a foamed porous one. Preferably, an irregular shaped crushed single particle or a granulated substance thereof is included.

FIG. 1 is a drawing showing one example of a filling apparatus 2 which can be used in the present invention. This filling apparatus 2 has a hopper scale 4, an intermediate part 6 provided with a heat retaining apparatus, an exhaustion control part 8 provided with a butterfly damper, a mounting part 10, a vibration generator 12, and a frame 14. This filling apparatus 2 is configured so that a member for filling 16 can be arranged. In the filling apparatus 2 of the present embodiment, a flexible container bag is used as the member for filling 16. In FIG. 1, the flexible container bag is shown by a double dotted chain line. It should be noted that, as the member for filling other than the flexible container bag, a container, a silo, a paper bag or the like is exemplified. In addition, a simple-type mobile silo (silo) is also exemplified. The present invention can apply, for example, a silo exemplified in WO2005/077786, to the member for filling according to the present invention.

Volume of the member for filling 16 is not especially limited, however, usually volume of the member for filling 16 is determined corresponding to total filling mass [W2 (kg)], and usually set 700 L to 2500 L, and preferably 1000 L to 2000 L.

The flexible container bag as the member for filling 16 is designed to have preferably a multi-layer structure of two layers or more. A preferable flexible container bag has an inner layer and an outer layer. A material composing the inner layer is not especially limited, however, it is preferably a material capable of preventing leakage of the particulate water-absorbing agent. As the material of the inner layer, any material can be adopted as long as it has moisture-proof property. Specifically, polyethylene (PE), polypropylene (PP), polyethylene terephthalate (PET), polyvinylchloride (PVC), an aluminum laminated material or an aluminum vapor deposited material, or the like is preferably included. In addition, a material composing the outer layer is not especially limited, however, woven fabric superior in strength, or the like is used preferably. In addition, the material composing the outer layer is not especially limited, as long as it has property as described above, however, specifically, polypropylene or the like is preferably included.

As shown in FIG. 1, the flexible container bag 16 is mounted on a vibrator (a pallet 26). By mounting, the whole flexible container bag 16 tends to vibrate. By vibrating the whole member for filling in this way, air present between the particulate water-absorbing agents to be filled is removed efficiently, and further uneven distribution of particle diameter of the particulate water-absorbing agent in filling can be suppressed as well. Therefore, the particulate water-absorbing agent obtained by such a method can stably maintain superior absorption characteristics such as absorbency against pressure (AAP) or liquid permeation (SFC). In this case, the opening part of the flexible container bag 16 is attached at an exhaustion port 18 of the filling apparatus 2. The flexible container bag 16 has a hanging belt 20, and this hanging belt 20 is hung by a hanging part 22 installed at the filling apparatus 2 side. The particulate water-absorbing agent falls down inside the flexible container bag 16 by gravitational force.

The hopper scale 4 is capable of automatically weighing a constant mass (for example, 500 kg) of the particulate water-absorbing agent, and exhausting this constant mass of the particulate water-absorbing agent downward. The particulate water-absorbing agent exhausted from the hopper scale 4 is exhausted from the exhaustion port 18 via the intermediate part 6 and the exhaustion control part 8, and flown inside the flexible container bag 16.

The exhaustion control part 8 is not especially limited in form thereof, and exhaustion timing of the particulate water-absorbing agent can be controlled by, for example, opening/closing of a butterfly damper.

The mounting part 10 is configured so that the flexible container bag 16 can be mounted. In addition, the mounting part 10 is arranged in a vibration-possible state. In this case, vibration form of the mounting part 10 is not especially limited. Preferable form includes: the mounting part 10 is arranged in such a state that it can vibrate in a horizontal direction; the mounting part 10 is arranged in such a state that it can vibrate in a vertical direction; and the mounting part 10 is arranged in such a state that it can vibrate in both a horizontal direction and a vertical direction. The mounting part 10 has a upper face 24. It is preferable that this upper face 24 is a flat plane. In this way, because force is loaded uniformly on the particulate water-absorbing agent to be filled in vibration of the member for filling, air present between these particulate water-absorbing agents is removed uniformly, and uneven distribution of particle diameter of the particulate water-absorbing agent in filling can be suppressed as well. Therefore, the particulate water-absorbing agent obtained by such a method can stably maintain superior absorption characteristics such as absorbency against pressure (AAP) or liquid permeation (SFC) or the like. At the upside of the mounting part 10, space allowing mounting of the flexible container bag 16 is present.

The vibration generator 12 is a generation source of vibration. The vibration generator 12 is not especially limited, however, an electromotive vibration generator 12 is preferable, and a known vibration motor is more preferable. The vibration motor is a motor which generates vibration by rotating an eccentric part. In the present embodiment, as this vibration motor, a low frequency vibration motor is used. As this low frequency vibration motor, for example, a trade name "KM170-2PA" manufactured by EXEN Corp. is included. Other than the vibration motor, a vibration exciter exemplified in JP-A-10-034084 is also applicable.

In the present embodiment, vibration generated from the vibration generator 12 is directly transmitted to the mounting part 10. The mounting part 10 vibrates with the vibration generator 12. Trajectory of this vibration is nearly circular. This vibration includes a vibration component of a vertical direction, and a vibration component of a horizontal direction.

As shown in FIG. 1, in the present embodiment, a pallet 26 is mounted on the mounting part 10, and on this pallet 26, the flexible container bag 16 is mounted. Vibration of the mounting part 10 is transmitted to the pallet 26. The pallet 26 vibrates in the same manner as the mounting part 10.

The filling method of the present embodiment includes the abutting step, the supply step and the vibration step.

[The Abutting Step]

The abutting step is a step for making the member for filling 16 for filling the particulate water-absorbing agent abutted on the vibrator. In the present embodiment, the vibrator is the pallet 26. The vibrator may be, for example, the mounting part 10, or may be the vibration generator 12 itself. In the present embodiment, the vibrator abuts on the bottom face of the member for filling 16, however, it may abut on the part other than the bottom face. However, in view of ensuring transmission of vibration to a filling substance, it is preferable that the vibrator is abutted on the bottom face of the member for filling 16, as in the present embodiment, and it is more preferable that the vibrator is abutted on the front face of the bottom face of the member for filling 16.

The flexible container bag 16 is arranged in an easy vibration state. That is, it is preferable that restriction of the flexible container bag 16 is made minimal. The hanging belt 20 is preferable to have a structure which substantially does not restrict vibration of the flexible container bag 16. In addition, an opening part of the flexible container bag 16 is attached at the exhaustion port 18, however, because the flexible container bag 16 is superior in flexibility, vibration is not substantially restricted by the exhaustion port 18. In view of making vibration of the filling substance easy, it is preferable that the flexible container bag 16 is supported only by the hanging belt 20, the exhaustion port 18 and the vibrator.

[The Supply Step]

The supply step is a step for supplying the particulate water-absorbing agent to the member for filling 16. The supply step may be performed one time. That is, in the supply step, total amount of the particulate water-absorbing agent to be supplied may be supplied without being interrupted. In addition, as will be described later, this supply step may be performed by being divided in multiple times. That is, in the supply step, after supplying of the particulate water-absorbing agent having mass A1, the supply may be interrupted once, and after that remaining mass A2 may be supplied. In this case, mass to be filled in the member for filling 16 (total amount of the particulate water-absorbing agent to be supplied) is (A1+A2). In view of increasing supply efficiency, it is preferable that supply of the particulate water-absorbing agent in this supply step is performed by the gravitative particulate water-absorbing agent. That is, it is preferable that this supply is performed by free falling of the particulate water-absorbing agent.

The particulate water-absorbing agent fallen by the supply step in one time tends to form an unevenly distributed layer where small particles are unevenly distributed upside, and large particles are unevenly distributed downward. By dividing the supply step in multiple times, this unevenly distributed layer becomes multiple layers, therefore an unevenly distributed part of large particles and an unevenly distributed part of small particles may be laminated alternately. Therefore, by performing the supply step in multiple times, the uneven distribution of particle diameter may be alleviated. When the supply step is performed in multiple times, supply times of the particulate water-absorbing agent is not especially limited, however, in consideration of alleviation of the uneven distribution of particle diameter, it is preferably 2 to 4 times, more preferably 2 to 3 times, and particularly preferably 2 times.

It is preferable that the supply step is performed after filling dry air into inside of the member for filling 16. Dry air in the present application is gas (air or the like) with a dew point of equal to or lower than $-10°$ C. By filling of dry air, moisture absorption of the particulate water-absorbing agent can be suppressed, and aggregation or adhesion of the particulate water-absorbing agent can be suppressed. Therefore, vibration effect may enhance. Preferably dew point of gas is $-100$ to $-10°$ C., and temperature is about $-10$ to $100°$ C., preferably 0 to $50°$ C., preferably 10 to $40°$ C., and still more preferably 20 to $30°$ C. (room temperature).

[The Vibration Step]

The vibration step is a step for vibrating the particulate water-absorbing agent present in the member for filling 16, by vibrating the vibrator. It has been clarified that by this vibration step, amount of air present between the particulate water-absorbing agents is suppressed and thus the uneven distribution of particle diameter can be suppressed.

In the embodiment, the particulate water-absorbing agent falls in the member for filling by gravitational force. This falling would generate air resistance. It is considered that by this air resistance, such tendency generates that particles with small particle diameter are present at the upper side, and particles with large particle diameter are present at the lower side. Therefore, it is considered that the particulate water-absorbing agent tends to be filled in a state that the larger particle diameter is present the more downward. It has been clarified that by the vibration step, this uneven distribution of particle diameter can be suppressed. It has been clarified that, accompanying with vibration, a part of fine powders present mainly at the surface layer moves downward, and thus the uneven distribution of particle diameter can be suppressed.

The filling substance contains air. That is, air is present between the particulate water-absorbing agent (particles) of the filling substance. When air is abundant between the particles, filling density decreases as the whole filling substance. Here, "filling density" is mass of the particulate water-absorbing agent per unit volume. When filling density is low, apparent filling volume increases, however, filled amount of the particulate water-absorbing agent itself decreases. That is, when filling density is low, mass of the particulate water-absorbing agent which can be filled in the member for filling having a certain volume becomes low. In this case, transportation efficiency may decrease. It is preferable that air between particles deflates in order to increase fill amount into the member for filling. It has been clarified that by the vibration step, this deeflating effect of air between particles (air deflating effect) is exerted.

In addition, the present invention may become more effective in the particulate water-absorbing agent containing a polyvalent metal salt such as aluminum sulfate, or a hydroxide thereof (in particular, a salt) or inorganic particles, in particular, a water-insoluble silica fine particle (for example, amorphous silica, for example, "Aerosil200CF", produced by Evonik Industries Co., Ltd.), or a polyamine polymer. One factor for this effect is considered to be suppression of blocking or powder fluidity by the polyvalent metal salt or the inorganic particles or the polyamine polymer, and thus enhancement of air deflating effect. When particles such as the inorganic particles are added, fine powders with a particle diameter thereof of equal to or smaller than 300 μm, still more equal to or smaller than 100 μm, and particularly equal to or smaller than 10 μm are added. Use of such a polyamine polymer, particles or polyvalent metal (salt/hydroxide) furnishes liquid permeation (for example, SFC) or anti-blocking (anti-caking) to the water-absorbing agent, but suppresses powder fluidity of the resultant water-absorbing agent, therefore filling is fluctuated or decreased, however, the present invention solves such problems and provides the particulate water-absorbing agent superior in liquid permeation or anti-blocking, and is thus applicable suitably. Water-absorbing agent exerts more effect in the filling method in the case of containing the polyamine polymer, the polyvalent metal salt, or water-insoluble fine powders, therefore, the present invention is applicable suitably. It should be noted that, the polyamine polymer or water-insoluble fine powders is exemplified in WO 2006/082188, WO 2006/082189, WO 2006/082197 or the like. Here, the polyamine polymer is not especially limited, however, a water-soluble one having a weight average molecular weight of equal to or higher than 3000, and still more an amine value of 1 to 30 mole/kg is preferable.

Air between particles contains moisture (humidity). This moisture can be absorbed by the particulate water-absorbing agent. By this moisture absorption, the surface of the particulate water-absorbing agent swells, and tends to provide aggregation among particles themselves. This aggregation may decrease water absorbing characteristic of the particulate water-absorbing agent. One factor for property enhancement of the particulate water-absorbing agent accompanied with the vibration step is considered to deflation of air containing humidity. In addition, air contained in the filling substance may give change over time to the particulate water-absorbing agent. This air may degenerate the particulate water-absorbing agent during transportation. The method of the present invention is capable of efficiently removing air present between the particulate water-absorbing agents by vibration, therefore the present invention is capable of suppressing this change in time course.

By vibration during transportation, air contained in the filling substance may be deflated in some cases. It has been clarified that when filling is performed in a state of including a large amount of air, volume (apparent volume) of the filling substance may decrease by vibration during transportation, and thus the flexible container bag may fall down during transportation. The present invention is capable of suppressing effectively such a trouble.

Temperature of the particulate water-absorbing agent in the vibration step is preferably equal to or higher than 30° C., and more preferably equal to or higher than 35° C. By setting the temperature high, aggregation of the particles themselves or adhesion of the particles to the member for filling is suppressed and vibration effect enhances. In view of maintaining property of the particulate water-absorbing agent, temperature of the particulate water-absorbing agent in the vibration step is preferably equal to or lower than 70° C.

As described above, the supply step may be performed in one time, or may be performed dividedly in N times. It should be noted that, N is an integer of two or more. When the supply step is performed dividedly in N times, it is preferable that the vibration step includes an intermediate vibration step performed at a stage where apart of a plurality of times of the supplying steps is completed, and a final vibration step performed at a stage where all of a plurality of times of the supplying steps are completed. It has been clarified that by dividing the supply step in multiple times, the effect accompanying with the vibration step can be enhanced further. In addition, when the supply step is performed dividedly in N times, the intermediate vibration step is enough to be performed at least at a part between each of the supply steps, and preferably it is performed at between each of the supply steps (in this case, number of the intermediate vibration step is N times).

It should be noted that, in the present invention, the supply step and the vibration step may be performed at the same time, or may be performed separately. In view of enhancing vibration effect by adding vibration also in the intermediate stage of the supply step, it is preferable that at least a part of the supply step and at least a part of the vibration step are performed at the same time. The supply step before the intermediate vibration step may be performed at the same time as the vibration step. The supply step after the intermediate vibration step may be performed at the same time as the vibration step. The intermediate vibration step may be performed at the same time as the supply step, or may be performed in a state that the supply step is stopped, however, it is preferable to be performed in a state that the supply step is stopped.

In view of enhancing the vibration effect, a total time Tt of vibration time is preferably equal to or longer than 30 seconds, and more preferably equal to or longer than 1 minute. This vibration time is measured as long as the particulate water-absorbing agent is present even a small amount in the member for filling, and includes vibration time in the intermediate of the supply step. It should be noted that in the present description, "vibration time" is time where a vibration generator is working. In view of shortening time required for filling, total time Tt of vibration time is preferably equal to or shorter than 3 minutes.

When interruption number of the supply step is too many, time required in the supply step increases, and efficiency of the filling step tends to decrease. In view of this point, division number (the N) of the supply step is preferably equal to or less than 4, and more preferably equal to or less than 3. In view of enhancing the effect accompanying with the vibration step, the division number N is preferably equal to or more than 2. In view of satisfying both the effect accompanying with the vibration step and efficiency of the supply step, the division number N is particularly preferably 2. In the present application, the effect accompanying with the vibration step may also be referred to simply as "vibration effect".

In the present application, in the intermediate vibration step, ratio (W1/W2) of mass of the particulate water-absorbing agent present in the member for filling, and total filling mass is not especially limited. In the present application, mass of the particulate water-absorbing agent present in the member for filling is defined as W1 (kg), and total mass of the particulate water-absorbing agent filled is defined as W2 (kg). The total mass W2 is the mass of the final particulate water-absorbing agent in a stage where the whole supply steps are completed. In view of enhancing vibration effect for the particulate water-absorbing agent supplied after the intermediate vibration step, ratio (W1/W2) is preferably equal to or larger than 0.3. In addition, from a similar viewpoint, in particular, when the N is 2, ratio (W1/W2) is preferably equal to or larger than 0.4. In view of enhancing vibration effect for the particulate water-absorbing agent supplied before the intermediate vibration step, ratio (W1/W2) is preferably equal to or smaller than 0.6.

The more is the filling amount, the more uneven distribution of particle diameter or comingle of air tends to generate. Therefore, the more is the filling amount, the more the vibration effect tends to be significant. From this viewpoint, the total filling mass W2 is preferably equal to or more than 500 kg, more preferably equal to or more than 700 kg, and more preferably equal to or more than 800 kg. When the total filling mass W2 is too much, transportation efficiency of the member for filling filled may decrease on the contrary in some cases.

From this viewpoint, the total filling mass W2 is preferably equal to or less than 1500 kg, and more preferably equal to or less than 1100 kg.

In view of suppressing property decrease or aggregation of the particulate water-absorbing agent accompanying with moisture absorption, it is preferable that in the supply step and the vibration step, relative humidity around the member for filling is set at equal to or lower than 65%, and more preferably equal to or lower than 60%. In view of suppressing excessive cost for air conditioning, relative humidity around the member for filling is preferably equal to or higher than 30%. It should be noted that, adjustment of this relative humidity is performed by setting, for example, relative humidity of air present around the filling apparatus 2 at the value. For example, adjustment of this relative humidity may be attained by air conditioning of a room where the filling apparatus 2 is arranged. And, air temperature around the member for filling is preferably 20 to 30° C., and temperature of the particulate water-absorbing agent in the vibration step is preferably 40 to 50° C.

In view of enhancing the vibration effect, a frequency of vibration of the vibrator is preferably equal to or higher than 30 Hz, more preferably equal to or higher than 40 Hz, and still more preferably equal to or higher than 50 Hz. The too high frequency of vibration may give excessive load to the vibrator. From this viewpoint, the frequency of vibration of the vibrator is preferably equal to or lower than 120 Hz, more preferably equal to or lower than 100 Hz, and still more preferably equal to or lower than 70 Hz.

In view of enhancing the vibration effect, amplitude V1 of the vibrator in a vertical direction is preferably equal to or larger than 1 mm, and more preferably equal to or larger than 1.5 mm. In view of suppressing excessive load to the vibrator, the amplitude V1 of the vibrator in a vertical direction is preferably equal to or smaller than 50 mm, still more preferably equal to or smaller than 5 mm, and particularly preferably equal to or smaller than 3 mm. Still more, vibration angle of the vibrator in a vertical direction is preferably 0 to 180°, still more preferably 15 to 165°, and particularly preferably 45 to 135°.

In view of enhancing the vibration effect, amplitude V2 of the vibrator in a horizontal direction is preferably equal to or larger than 1 mm, and more preferably equal to or larger than 1.5 mm. In view of suppressing excessive load to the vibrator, the amplitude V2 of the vibrator in a horizontal direction is preferably equal to or smaller than 50 mm, still more preferably equal to or smaller than 5 mm, and particularly preferably equal to or smaller than 3 mm. Still more, vibration angle of the vibrator in a horizontal direction is preferably 0 to 180°, still more preferably 15 to 165°, and particularly preferably 45 to 135°.

In the present description, "vibration exciting angle" means a vibration direction given in the case when the particulate water-absorbing agent is moved up and down in a vertical direction, or changed in translational motion in a lateral (horizontal) direction, when the filling substance of the particulate water-absorbing agent is motioned tree-dimensionally by vibration, by giving mechanical vibration to the particulate water-absorbing agent. It should be noted that, vibration exciting angle (°) in a horizontal direction can be specified by vibration angle of the center of the vibrator observed from the upper part, while vibration exciting angle in a vertical direction can be specified by vibration angle at the center of the vibration observed from the side part (the side part showing maximal value of vibration).

[The Particulate Water-Absorbing Agent]

Mass average particle diameter (D50) specified by JIS standard sieve classification of the particulate water-absorbing agent obtained by the filling method, is preferably 200 to 800 μm, more preferably 200 to 450 μm, more preferably 220 to 430 μm, and further preferably 250 to 400 μm. In addition, the present invention can exert effect most, when the particulate water-absorbing agent has specific particle size distribution. As the preferable particle size distribution, ratio of particles to be classified within the upper and the lower limit of 850 to 150 μm (specified by the JIS standard sieve; Z8801-1 (2000)), is preferably 90 to 100% by mass, further preferably 95 to 100% by mass, and particularly preferably from 98 to 100% by mass, relative to total of the water-absorbing agent. A substance passing 150 μm is classified by the JIS standard sieve (specified by Z8801-1 (2000)). In addition, the particle size distribution is preferably in a specific range, to exert maximum effect, and logarithm standard deviation (σζ) is preferably 0.20 to 0.50, more preferably 0.25 to 0.45, and further more preferably 0.30 to 0.40. When the logarithm standard deviation (σζ) is outside this range, there may be the case where liquid permeation or water absorbing speed decreases. It should be noted that, the logarithm standard deviation of the particle size distribution or the mass average particle diameter is specified by the specification of US-A-2006/0204755. In addition, particle shape includes spherical-shape, nearly spherical-shape, irregular shaped pulverized substance or a granulated substance thereof (aggregated substance), however, the particle may be a foam, but in view of water absorbing speed or fixing property to pulp, it is preferably an irregular shaped shape one or a granulated substance thereof.

In addition, the particulate water-absorbing agent filled according to the method of the present invention can reduce variation between lots, of content (that is, ratio of particles smaller than 150 μm) of a substance passing 150 μm. Therefore, the particulate water-absorbing agent filled according to the method the present invention can suppress variation of AAP or SFC which is labile to influence by presence of the particles smaller than 150 μm. In consideration of suppression effect of variation of AAP or SFC, it is preferable that logarithm standard deviation (σζ) of particle size distribution of the substance passing 150 μm (that is, ratio of particles smaller than 150 μm (% by mass)) is equal to or larger than 0.1 and below 0.29, more preferably 0.12 to 0.28, and particularly preferably 0.15 to 0.25.

The water-absorbing agent includes, as described above, the polyamine polymer, the polyvalent metal or salt thereof and the water-insoluble fine particle, and in particular, in an amount of 0.001 to 5 parts by weight, and still more 0.01 to 3 parts by weight, relative to 100 parts by weight of the water-absorbing resin, they are applicable suitably to the water-absorbing agent. It should be noted that, when the water-absorbing agent contains the polyamine polymer, the polyvalent metal or salt thereof and the water-insoluble fine particle, it is preferable that these components are present at the surface of the water-absorbing agent (the water-absorbing agent particles). As the additives of the water-absorbing agent, the polyvalent metal salt such as aluminum sulfate or the like, in particular, a water-soluble polyvalent metal salt is preferable, and technology described in U.S. Pat. No. 7,179,862, EP No. 1165631, U.S. Pat. Nos. 7,157,141, 6,831,142, USP-A-2004/176557, USP-A-2006/204755, USP-A-2006/73969, USP-A-2007/106013 is applied.

When fine powders are present in mixed as the particulate water-absorbing agent, the fine powders tend to be unevenly distributed at a surface layer. That is, caused by air resistance in falling, the fine powders tend to be accumulated at the surface layer of the filling substance. On the contrary, in the method of the present invention, by the vibration step, uneven distribution of the fine powders at the surface layer can be suppressed. In addition, by interrupting the supply step as above, uneven distribution of the fine powders can be suppressed further.

In addition, the present invention becomes more effective in the particulate water-absorbing agent including the polyvalent metal salt such as aluminum sulfate, or inorganic particles. It is considered that this is brought about by the effect that suppression of blocking by the polyvalent metal salt or the inorganic particles can promote alleviation of uneven distribution by vibration.

As described above, in the present invention, owing to suppression of absorption of humidity or the like, property of the particulate water-absorbing agent can be enhanced. Explanation will be given below on preferable property.

Absorbency against non-pressure (CRC) for a normal saline solution of the particulate water-absorbing agent to be used in the present invention is preferably equal to or higher than 15 g/g. The absorbent articles such as disposable diapers, where this particulate water-absorbing agent is used, absorb body fluid or the like well. In general, when the particulate water-absorbing agent having the absorbency against non-pressure of below 15 g/g is used in absorbent articles such as disposable diapers, it could not provide high property. On the other hand, because the higher is the absorbency against non-pressure, the higher property of the absorbent articles is obtained, the upper limit thereof is not especially limited, however, in view of production difficulty as well as cost increase, the upper limit of the absorbency against non-pressure is considered preferable to be about equal to or lower than 70 g/g. This absorbency against non-pressure is more preferably 15 to 60 g/g, and particularly preferably 25 to 45 g/g.

(Measurement of CRC)

In the present description, absorbency against non-pressure (CRC) for a normal saline solution is measured as follows: Firstly, 0.2 g of the particulate water-absorbing agent is weighed accurately (this mass is "mass of the particulate water-absorbing agent" in the following expression), and put uniformly in a bag made of nonwoven fabric (60 mm×85 mm). This bag is immersed in a normal saline solution with a temperature adjusted at 25±2° C. for 30 minutes. After 30 minutes, this bag is pulled up, and drained for 3 minutes using a centrifugal separation apparatus (a compact-type centrifugal separation apparatus, model-type: H-122, manufactured by Kokusan Co., Ltd.), under 250 G (250×9.81 m/s²). Next, mass W2 (g) of the bag after draining is measured. In addition, similar operation is performed on the bag made of nonwoven fabric without containing the particulate water-absorbing agent, and mass W1 (g) of this bag is measured. Absorbency against non-pressure is calculated according to the following expression, using these mass W2 and W1.

CRC (g/g)=[(W2−W1)/mass of the particulate water-absorbing agent]−1    [Expression 1]

Absorbency against pressure (AAP) under a load of 4.8 kPa for a normal saline solution of the particulate water-absorbing agent used in the present invention is preferably equal to or higher than 15 g/g. The absorbent articles such as disposable diapers, where such a particulate water-absorbing agent is used, absorb body fluid or the like well. AAP of the particulate water-absorbing agent is more preferably equal to or higher than 20 g/g, still more preferably equal to or higher than 22 g/g, far more preferably equal to or higher than 23.5 g/g, particularly preferably equal to or higher than 24 g/g, and most preferably equal to or higher than 26 g/g. Although reason is not clear, it has been clarified that the filling method of the present invention is effective when AAP is large. By vibration filling of the present invention, uneven distribution of the fine powders at the surface layer part is alleviated, and variation of AAP caused by uneven distribution of the fine powders is decreased. For the particulate water-absorbing agent having large AAP, quality control is required severely, and thus setting of variation of AAP to a small level increases quality stabilization degree. On the other hand, because the higher is the absorbency against pressure, the higher property of the absorbent articles is obtained, the upper limit thereof is not especially limited, however, in view of production difficulty as well as cost increase, the upper limit of the absorbency against pressure is considered to be about 35 g/g. This absorbency against pressure under a load of 4.8 kPa for a normal saline solution is referred to, in the present application, as AAP (4.8 kPa) or simply AAP.

In addition, as described above, according to the filling method of the present invention, the particulate water-absorbing agent after filling maintains high AAP and is capable of suppressing variation thereof. The absorbent articles such as disposable diapers, where such a particulate water-absorbing agent is used, absorb body fluid or the like well.

In addition, standard deviation of AAP of the particulate water-absorbing agent after filling by the method of the present invention is preferably 0.01 to 0.30, and more preferably 0.15 to 0.25. When AAP is within such a range, AAP of the particulate water-absorbing agent as a final product can be maintained at a high level.

(Measurement of AAP)

In the present description, absorbency against pressure (AAP) is measured as follows: Firstly, in the measurement of AAP, a supporting cylinder made of plastic having an inner diameter of 60 mm, is prepared. At the bottom of this supporting cylinder, a metal mesh made of stainless steel is welded. This metal mesh has a mesh number of 400 mesh (a sieve mesh size of 38 μm). On the other hand, a piston (cover plate) having an outer diameter of a little smaller than 60 mm, and having no clearance between the wall surface of the supporting cylinder and itself, and being able to slide up and down, is also prepared. On the metal mesh, the water-absorbing agent with a mass of W3 (specifically, about 0.900 g) is spread uniformly. On this water-absorbing agent, the piston is mounted to measure mass W4 (g) of supporting cylinder, the water-absorbing agent and the piston. By mounting a weight on this piston, a pressure of 4.8 kPa (50 g/cm²) is uniformly loaded to the water-absorbing agent. Inside a Petri dish with a diameter of 150 mm, a glass filter with a diameter of 90 mm, and a thickness of 5 mm is put. Into the Petri dish, a normal saline solution, whose temperature is adjusted to 25±2° C., is poured, so as to become the same level as the upper surface of the glass filter. On the upper surface of this glass filter, one sheet of a filter paper with a diameter of 9 cm (No. 2, produced by Toyo Filter Paper Co., Ltd.) is put. All the surface of this filter paper is wet with the saline solution. After that, excess saline solution is removed. The supporting cylinder and the piston are put on the Petri dish so that the metal mesh contacts with this filter paper. The water-absorbing agent absorbs the saline solution under pressure. When water surface of the saline solution becomes lower than the upper surface of the glass filter, the saline solution is replenished to maintain the water surface level constant. After one hour, the supporting cylinder and the piston are picked up from the Petri dish to measure mass W5 (g) excluding the weight. This mass W5 (g) includes mass of the water-absorbing agent swollen by the saline solution. Absorbency against pressure (AAP) is calculated by the following expression.

$$AAP\ (g/g)=(W5-W4)/W3 \qquad \text{[Expression 2]}$$

It should be noted that, the measurement is performed under an environment of 23±2° C. Such a measurement method has been disclosed in U.S. Pat. No. 6,071,976.

Saline flow conductivity (SFC) of the particulate water-absorbing agent obtainable by the production method of the present invention is a value showing liquid permeation in swelling of the particulate water-absorbing agent or the water-absorbing agent. This saline flow conductivity is also called liquid permeation. The larger is the value of this saline flow conductivity (SFC), the particulate water-absorbing agent shows to have the higher liquid permeation. This saline flow conductivity (SFC) is preferably equal to or higher than 30 ($\times 10^{-7} \cdot cm^3 \cdot s \cdot g^{-1}$). The absorbent articles such as disposable diapers, where this particulate water-absorbing agent is used, absorb body fluid or the like well. SFC is more preferably equal to or higher than 35 ($\times 10^{-7} \cdot cm^3 \cdot s \cdot g^{-1}$) and still more preferably equal to or higher than 45 ($\times 10^{-7} \cdot cm^3 \cdot s \cdot g^{-1}$). In the absorbent articles containing such a particulate water-absorbing agent, even when concentration of the particulate water-absorbing agent contained in the goods is equal to or higher than 30% by mass and more specifically equal to or higher than 50% by mass, absorption speed of urine is maintained suitably, and generation of leakage is also suppressed.

In addition, as described above, according to the filling method of the present invention, the particulate water-absorbing agent after filling maintains high SFC and is capable of suppressing variation thereof. The absorbent articles such as disposable diapers, where such a particulate water-absorbing agent is used, absorb body fluid or the like well. SFC of the particulate water-absorbing agent after filling by the method of the present invention is preferably equal to or higher than 40 ($\times 10^{-7} \cdot cm^3 \cdot s \cdot g^{-1}$), and more preferably equal to or higher than 45.5 ($\times 10^{-7} \cdot cm^3 \cdot s \cdot g^{-1}$). In addition, standard deviation of SFC of the particulate water-absorbing agent after filling by the method of the present invention is preferably 4.0 to 6.0, and more preferably 4.5 to 5.5. When the standard deviation is within such a range, SFC of the particulate water-absorbing agent as a final product can be maintained at a high level without variation.

(Measurement of SFC)

In the present description, saline flow conductivity (SFC) is measured as follows: Firstly, 0.900 g of the water-absorbing agent is put uniformly in a container. This water-absorbing agent is pressurized at 2.07 kPa, while being immersed into artificial urine. After 60 minutes, height of the swollen water-absorbing agent (gel layer) is recorded. In a state that the water-absorbing agent is pressurized at 2.07 kPa, a 0.69% by mass normal saline solution is passed through the gel layer. Room temperature in this case is adjusted at 20° C. to 25° C. Using a computer and a balance, fluid amount passing through the gel layer is recorded in an interval of 20 seconds to calculate flow velocity Fs (T) of the fluid passing. Flow velocity Fs (T) is calculated by dividing increased mass (g) by increased time (s). Time when hydrostatic pressure of the saline solution becomes constant and stable flow velocity is obtained, is adopted as Ts, and only data measured for 10 minutes from this Ts is used in flow velocity calculation. From flow velocity measured for 10 minutes from the Ts, value of Fs (T=0) is obtained. This value is initial flow velocity for passing through the gel layer. Fs (T) is plotted against time, and Fs (T=0) is calculated based on result obtained by the least square method. Saline flow conductivity (SFC) is calculated by the following expression.

$$SFC=(Fs(t=0) \cdot L0)/(\rho \cdot A \cdot \Delta P) \qquad \text{[Expression 3]}$$

In this expression, L0 is a height (cm) of the gel layer, $\rho$ is a density (g/cm$^3$) of the saline solution, A is cross-sectional area A (cm$^2$) of the gel layer and $\Delta P$ is hydrostatic pressure (dyne/cm$^2$) loaded on the gel layer. The artificial urine is obtained by mixing 0.25 g of a dehydrate of calcium chloride, 2.0 g of potassium chloride, 0.50 g of a hepta-hydrate of magnesium chloride, 2.0 g of sodium sulfate, 0.85 g of ammonium dihydrogen phosphate, 0.15 g of diammonium hydrogen phosphate, and 994.25 g of pure water. Such an evaluation is performed in accordance with the SFC test described in U.S. Pat. No. 5,849,405.

From the view point that superior property of the above-described particulate water-absorbing agent can be maintained and blocking can be prevented, in the supply step and the vibration step, gas (air) in the member for filling has preferably a dew point thereof of equal to or lower than −10° C., more preferably equal to or lower than −15° C., and particularly preferably equal to or lower than −20° C. In addition, the lower limit of the dew point is −100° C., and the dry air is suitably used.

Absorbent articles, which are made using the particulate water-absorbing agent according to the present invention, can be obtained, for example, by forming the particulate water-absorbing agent and, as needed, a hydrophilic fiber in a sheet-like shape. When the hydrophilic fiber is not used, the absorbent articles can be obtained by fixing the particulate water-absorbing agent in paper or nonwoven fabric. Content (core concentration) of the particulate water-absorbing agent in such absorbent articles is, for example, 10 to 100% by mass, preferably 30 to 100% by mass, and more preferably 50 to 100% by mass. In addition, it is desirable that this absorbent articles are adjusted to have a density in a range of 0.06 to 0.5 g/cc, and a basis mass is in a range of 0.01 to 0.2 g/cm$^2$. It should be noted that, as a fiber substrate 34 to be used, for example, hydrophilic fiber such as pulverized wood pulp, cotton linter or cross-linked cellulose fiber, rayon, cotton, wool, acetate fiber, vinylon fiber may be exemplified, and the airlaid one is preferable.

EXAMPLES

Effect of the present invention will be clarified below with reference to Examples, however, the present invention should not be construed restrictive, based on description of these Examples.

[A Production Example of the Particulate Water-Absorbing Agent]

The particulate water-absorbing agent was produced continuously as follows by connecting apparatuses for performing each of the polymerization step, the gel grain refining (crushing) step, the drying step, the pulverization step, the classification step, the surface cross-linking step (the spraying step of a surface cross-linking agent, the heating step), the cooling step, the product storing/the filling step, and the granule sizing step by the transportation apparatus, and by using a continuous production apparatus which is capable of performing each step continuously.

Under continuously feeding a monomer aqueous solution (1) whose temperature is 91° C. using a metering pump, sodium persulfate was mixed continuously to perform polymerization on a belt continuously. In this monomer aqueous solution (1), polyethylene glycol diacrylate (average addition mole number, "n", of ethylene oxide is 9) was contained as an internal cross-linking agent in an amount of 0.06% by mole, relative to total amount of the monomer. In addition, in the monomer aqueous solution (1), a partial sodium salt of acrylic acid with 73% by mole neutralized was contained, and concentration of this partial sodium salt of acrylic acid was adjusted to 43% by mass, relative to total mass of the monomer aqueous solution (1). In addition, in the continuous mixing, mixing ratio of the sodium persulfate was adjusted to 0.10 g, relative to 1 mole of the monomer contained in the monomer aqueous solution (1) (about 0.11% by mass, relative to use amount of the monomer).

By this continuous polymerization on the belt, a water-containing gel-like cross-linked polymer (2) was obtained. This water-containing gel-like cross-linked polymer (2) was segmentalized using a meat chopper, and spread and mounted on a dryer, to be subjected to drying at 185° C. for 30 minutes, to obtain a dried polymer. Total amount of the relevant dried polymer was supplied continuously to a roll mill for pulverization, and then classified using a classification (sieving) apparatus having a metal mesh with a sieve mesh size of 850 μm and 150 μm to obtain the particulate water-absorbing resin (3), where content of particles with a size of 850 μm to 150 μm is about 98% bay mass.

Subsequently, a surface cross-linking agent solution was sprayed with a sprayer, while continuously supplying the resultant particulate water-absorbing resin (3) to a high speed continuous mixer in 3000 kg/hr, to obtain a mixture (4) where the water-absorbing resin (3) and the surface cross-linking agent solution were mixed. This surface cross-linking agent solution is a mixture of 1,4-butanediol, propylene glycol and pure water, and this surface cross-linking agent solution was spray mixed so as to attain a ratio of 1,4-butanediol, propylene glycol and pure water, 0.30 part by mass, 0.50 part by mass and 2.7 parts by mass, respectively, relative to 100 parts by mass of the water-absorbing resin (3).

Next, after performing heating processing of the resultant mixture (4) continuously at 198° C. for 40 minutes by a paddle dryer, it was cooled to 60° C. compulsorily using a similar paddle dryer (the cooling step). In this cooling step, in a zone at a temperature of about 90° C. in a cooling machine apparatus, 1.0 part by mass of aluminum sulfate-tetradeca to octadeca hydrate salt, relative to 100 parts by mass of the water-absorbing resin, was added (an aqueous solution with a concentration of 8% by mass, as converted to $Al_2O_3$ was used) to be mixed uniformly. Then, the particulate water-absorbing agent exhausted from the cooling machine was classified using a sieving apparatus to obtain a substance passing the 850 μm, and a substance not passing the 850 μm was pulverized again, and then mixed with the substance passing the 850 μm. In this way, the particulate water-absorbing agent was obtained, where the whole amount was the substance passing the 850 μm, having the mass average particle diameter (D50) of about 430 μm, and the logarithm standard deviation (σζ) of the particle size distribution of about 0.39, and granule-sized. In addition, the particulate water-absorbing agent obtained in this way had the absorbency against pressure (AAP) of 23.9 g/g, and saline flow conductivity (SFC) of 45.0 ($\times 10^{-7} \cdot cm^3 \cdot s \cdot g^{-1}$).

Example 1

Using a filling apparatus shown in FIG. 1, the particulate water-absorbing agent obtained finally in the production example was filled. Relative humidity around (atmosphere around) the filling apparatus was set at 60% by an air conditioner. Before the filling, a flexible container bag was inflated with dry air (dew point: −30° C.) to fill dry air to inside space of the flexible container bag. Next, as shown in FIG. 1, the flexible container bag was set so as to abut on a pallet. Volume of the flexible container bag is 1600 L, and the flexible container bag having a two-layer structure was used, where the inner layer is a film made of polyethylene, and the outer layer is a fabric made of polypropylene. Next, the supply step was performed. The supply step was performed dividedly in two times. Firstly, in the first time supply step, 500 kg of the particulate water-absorbing agent was put in the flexible container bag. During the period when the first time supply step was performed, the vibration step was performed at the same time. Time required in the first time supply step was 1 minute. Next, supply was interrupted. During the period when the supply was interrupted, the vibration step was also stopped. Next, the second time supply step was performed. In this second time supply step, 500 kg of the particulate water-absorbing agent was put. That is, in the present Example, mass W1 was 500 kg, and mass W2 was 1000 kg. During the period when the second time supply step was performed, the vibration step was also performed at the same time. Time required in the second time supply step was 1 minute. Therefore, total time Tt of the vibration time was 2 minutes. In the Example, the whole supply steps (total time) were performed at the same time as the vibration step. In the vibration step, frequency of a vibration motor was set at 57.5 Hz. Amplitude V1 of the vibrator in a vertical direction was 2.1 mm, and amplitude V2 of the vibrator in a horizontal direction was 2.1 mm. In addition, vibration angle of the vibrator in a vertical direction was 90°, and vibration angle of the vibrator in a horizontal direction was 90°. Temperature of the particulate water-absorbing agent in the vibration step was 40° C. to 50° C. It should be noted that air temperature around the filling apparatus was set at 20° C. to 30° C.

Comparative Example 1

Comparative filling was performed similarly as in Example, except that the vibration motor was not operated at all, and instead, the supply step was performed while a worker knocked the flexible container bag, and still more the supply step was performed once.

[Evaluation 1: Ratio (% by Mass) of Particles Smaller than 150 μm]

On samples taken from a filled product in the flexible container bag, ratio of particles smaller than 150 μm was measured. A sampling position of these samples in a depth direction was set at the surface part of the filled product. The surface part means a depth from the surface of the filled product in a range of 0 mm to 50 mm. The sampling position of these samples in a horizontal direction was set 200 mm outside from the center position of the filled product. The filling was performed in the same times as sampling number shown in Table 1, and evaluation was performed by sampling one sample from each filled product at each time. Therefore, sampling number (data number) of the sample is also the same as sampling number shown in Table 1. Average value, maximum value, minimum value and standard deviation of measurement values are shown in the following Table 1.

[Evaluation 2: Absorbency Against Pressure AAP (g/g)]

On each of the samples taken in the Evaluation 1, absorbency against pressure (AAP) was measured. Similarly as in the Evaluation 1, sampling number (data number) of the sample is the same as sampling number shown in Table 2. Average value, maximum value, minimum value and standard deviation of measurement values are shown in the following Table 2.

[Evaluation 3: Saline Flow Conductivity SFC $(\times 10^{-7} \cdot cm^3 \cdot s \cdot g^{-1})$]

On each of the samples taken in the Evaluation 1, saline flow conductivity (SFC) was measured. Similarly as in the Evaluation 1, sampling number (data number) of the sample is the same as sampling number shown in Table 3. Average value, maximum value, minimum value and standard deviation of measurement values are shown in the following Table 3.

Standard deviation shown in the following Table is calculated as follows. Total of square of deviation is determined, and value of this total divided with data number is dispersion. Standard deviation is root of this dispersion. Deviation means (measured value−average value). Standard deviation shows variation of data, and in the present Example, becomes an index showing quality stability degree. The smaller is the standard deviation, the more superior is the quality stability degree.

It should be noted that, absorbency against pressure (AAP) was measured by a measurement method for AAP (4.8 kpa) above, and saline flow conductivity (SFC) was measured by a measurement method for SFC above. In addition, ratio of particles smaller than 150 μm was defined as ratio (% by mass) of particles passed through the JIS standard sieve with a sieve mesh size of 150 μm.

TABLE 1

Analysis result of ratio (% by mass) of particles smaller than 150 μm

| <after filling> | Example 1 (with vibration filling) | Comparative Example 1 (without vibration filling) |
|---|---|---|
| Average value | 0.7 | 0.8 |
| Standard deviation | 0.21 | 0.29 |
| Maximum value | 3.1 | 2.0 |
| Minimum value | 0.3 | 0.2 |
| Sampling number | 609 | 276 |

TABLE 2

Analysis result of AAP (absorbency against pressure: g/g)

| <after filling> | Example 1 (with vibration filling) | Comparative Example 1 (without vibration filling) |
|---|---|---|
| Average value | 24.1 | 23.9 |
| Standard deviation | 0.21 | 0.38 |
| Maximum value | 24.6 | 24.7 |
| Minimum value | 22.9 | 21.0 |
| Sampling number | 609 | 295 |

TABLE 3

Analysis result of SFC (saline flow conductivity: $\times 10^{-7} \cdot cm^7 \cdot s \cdot g^{-1}$)

| <after filling> | Example 1 (with vibration filling) | Comparative Example 1 (without vibration filling) |
|---|---|---|
| Average value | 45.8 | 45.2 |
| Standard deviation | 5.2 | 6.7 |
| Maximum value | 77 | 70 |
| Minimum value | 26 | 21 |
| Sampling number | 609 | 276 |

As show in the Table 1, Table 2 and Table 3, Example 1 shows smaller standard deviation in any of ratio (% by mass) of particles smaller than 150 μm, AAP (g/g) and SFC ($\times 10^{-7} \cdot cm^3 \cdot s \cdot g^{-1}$), as compared with Comparative Example 1. From these results, superiority of Example is obvious. In particular, stabilization of absorption characteristics (for example, absorbency against pressure or liquid permeation) of a product brings about great effect in performing mass production continuously.

Industrial Applicability

The method for filling according to the present invention is applicable to filling of the particulate water-absorbing agent. This particulate water-absorbing agent is suitably applicable to produce absorbent articles such as hygiene materials including absorbing bodies such as, for example, disposable diapers or sanitary napkins, incontinent pads.

Description Of Reference Numerals

| | |
|---|---|
| 2 | Filling apparatus |
| 4 | Hopper scale |
| 6 | Intermediate part |
| 8 | Exhaustion control part |
| 10 | Mounting part |
| 12 | Vibration generator |
| 14 | Frame |
| 16 | Member for filling |
| 26 | Pallet |

The invention claimed is:

1. A method for filling a particulate water-absorbing agent having as a main component a water-absorbing resin, comprising:

an abutting step for making a member for filling the particulate water-absorbing agent abutted on a vibrator;

a supplying step for supplying the particulate water-absorbing agent to the member for filling; and a vibration step for vibrating the particulate water-absorbing agent present in the member for filling by vibrating the vibrator, wherein the particulate water-absorbing agent is a polyacrylic acid or a salt based water-absorbing resin and further includes a polyamine polymer, a polyvalent metal or a salt thereof, or a water-insoluble inorganic fine particle.

2. The filling method according to claim 1, wherein at least a part of the supplying step and at least a part of the vibration step are performed at the same time.

3. The filling method according to claim 1, wherein in the supplying step and the vibration step, relative humidity around the member for filling is 30% to 65%.

4. The filling method according to claim 1, wherein in the vibration step, the vibrator is vibrated in a frequency of vibration of 30 Hz to 120 Hz.

5. The filling method according to claim 1, wherein the member for filling is a flexible container bag; and in the abutting step, the flexible container bag is mounted on the vibrator.

6. The filling method according to claim 1, wherein the supplying step is performed by dividing into a plurality of times;

the vibration step comprises an intermediate vibration step performed at a stage where a part of a plurality of times of the supplying steps is completed, and a final vibration step performed at a stage where all of a plurality of times of the supplying steps are completed.

7. The filling method according claim 6, wherein in the intermediate vibration step, ratio (W1/W2) of mass [W1 (kg)]

of the particulate water-absorbing agent present in the member for filling to total mass [W2 (kg)] of the particulate water-absorbing agent filled is 0.3 to 0.6; and total mass [W2 (kg)] of the particulate water-absorbing agent filled is 500 kg to 1500 kg.

8. The filling method according to claim 1, wherein AAP (4.8 kPa) of the particulate water-absorbing agent is equal to or higher than 15 g/g.

9. The filling method according to claim 1, wherein temperature of the particulate water-absorbing agent in the vibration step is 30 to 70° C.

10. The filling method according to claim 1, wherein the water-absorbing resin is an irregular shaped pulverized substance obtained by continuous kneader polymerization or continuous belt polymerization.

11. The filling method according to claim 1, wherein the particulate water-absorbing agent further includes a polyvalent metal or a salt thereof.

12. The filling method according to claim 11, wherein the particulate water-absorbing agent is formed by mixing the polyvalent metal or a salt thereof with the water-absorbing resin as an aqueous solution.

13. The filling method according to claim 11, wherein the polyvalent metal or a salt thereof is an aluminum salt.

14. The filling method according to claim 11, wherein the polyvalent metal or a salt thereof is in an amount of 0.001 to 5 parts by weight, relative to 100 parts by weight of the water-absorbing resin.

15. The filling method according to claim 1, wherein the polyamine polymer, the polyvalent metal or a salt thereof, or the water-insoluble inorganic fine particle is in an amount of 0.001 to 10 parts by weight, relative to 100 parts by weight of the water-absorbing resin.

* * * * *